United States Patent

Bremer et al.

[19]

[11] Patent Number: 5,915,003

[45] Date of Patent: *Jun. 22, 1999

[54] SKETCHING UNIT FOR TRANSMISSION OF SKETCHES AND NOTES OVER NORMAL TELEPHONE LINES

[75] Inventors: Gordon Bremer, Clearwater, Fla.; Ahmad M. Hassan, Madison, N.J.; John C. Krejci, Sparta, N.J.; Susan J. Seamon, Somerset, N.J.; Kenneth David Ko, Clearwater, Fla.; Luke J. Smithwick, Aberdeen, N.J.; Richard Kent Smith, Seminole, Fla.

[73] Assignee: Lucent Technologies Inc., Murray Hill, N.J.

[*] Notice: This patent is subject to a terminal disclaimer.

[21] Appl. No.: 08/802,976

[22] Filed: Feb. 20, 1997

Related U.S. Application Data

[63] Continuation of application No. 08/369,764, Jan. 6, 1995, Pat. No. 5,719,923, which is a continuation-in-part of application No. 08/076,505, Jun. 14, 1993, Pat. No. 5,448,555.

[51] Int. Cl.$^6$ .................................................. H04M 11/00
[52] U.S. Cl. ................................ 379/93.19; 379/93.21; 379/93.17; 379/100.01
[58] Field of Search .............................. 379/93.19, 93.21, 379/93.17, 93.08, 93.01, 100.01; 348/13–19; 345/1, 2, 330, 331, 173, 179, 180

[56] References Cited

U.S. PATENT DOCUMENTS

| | | | |
|---|---|---|---|
| 3,912,860 | 10/1975 | Sasabe et al. | 178/6.8 |
| 4,512,013 | 4/1985 | Nash et al. | 370/69.1 |
| 4,546,212 | 10/1985 | Crowder, Sr. | 179/2 C |
| 4,659,876 | 4/1987 | Sullivan et al. | 379/96 |
| 4,672,602 | 6/1987 | Hargrave et al. | 370/58 |
| 4,757,495 | 7/1988 | Decker et al. | 370/76 |
| 4,827,085 | 5/1989 | Yaniv et al. | 178/18 |
| 4,911,536 | 3/1990 | Ditzik | 350/351 |
| 4,924,516 | 5/1990 | Bremer et al. | 380/46 |
| 5,081,647 | 1/1992 | Bremer | 375/5 |
| 5,103,227 | 4/1992 | Betts | 341/61 |
| 5,105,443 | 4/1992 | Betts et al. | 375/39 |
| 5,119,319 | 6/1992 | Tanenbaum | 364/514 |
| 5,309,555 | 5/1994 | Akins et al. | 395/157 |

OTHER PUBLICATIONS

Bukhiver, Telecommunications & Radio Eng., vol. 30/31 Jul. 1976, pp. 66–70.

Lockhart, et al., Electronic Letters, 29$^{th}$ ed. Apr. 1982, vol. 18, No. 9, pp. 379–381.

Shum, et al., IEEE, Communications 78, Communications Equipment and Systems, pp. 111–113, undated.

(List continued on next page.)

*Primary Examiner*—Stella Woo

[57] ABSTRACT

A sketching system sketches first notes to be transmitted over a telephone line receives second notes from another sketching system. The sketching system includes a signal de-combiner device, receiving the second notes from the another sketching system and voice data as a combined signal via the telephone line and de-combining the combined signal into the second notes and the voice data. In addition, the sketching system includes a sketching unit connected to the signal de-combiner. The sketching unit includes a note displaying device displaying the first and second notes, a note generating device generating the first notes, and a processor connected to the note displaying and generating devices and to the signal de-combiner, receiving the first notes from the note generating device, receiving the second notes to the note displaying device. The sketching unit further includes a clearing unit selectively clearing one of the note displaying device and another note displaying device of the another sketching system and an erase unit selectively erasing the first and second notes displayed on one of the note displaying device and the another note displaying device. Finally, the sketching system includes a first lock device selectively preventing the processor from transmitting the first notes to the signal de-combiner preventing the first notes from being displayed on the another sketching system, and a second lock device for selectively preventing the processor from transmitting the second notes to the note displaying device.

21 Claims, 19 Drawing Sheets

OTHER PUBLICATIONS

Adams, IEEE, Electronics & Power, Sep. 1980, Speech–band data modems.

Stagg, et al., IEEE, 1980, An Integrated Digital Subscribers Speech and Data Service, pp. 39.6.1–39.6.6.

Peled, et al., IEEE 1980, Frequency Domain Data Transmission using Reduced Computational Complexity Algorithms, pp. 964–967.

Akashi, et al., IEEE, Transactions on Communications, vol. Com–30, No. 5, May 1982, High–Speed Digital and Analog Parallel Transmission Technique Over Single Telephone Channel, pp. 12–13–1218.

Steele, et al., The Bell System Technical Journal, Nov. 1981, Simultaneous Transmission of Speed and Data Using Code––Breaking Techniques, pp. 2081–2105.

Lim et al., The Bell System Technical Journal, vol. 60, No. 9, Nov. 1981, Adaptive Equalization and Phase Tracking for Simultaneous Analog/Digital Data Transmission, pp. 2039–2063.

Operations Manual, TW 101 Telewriting Terminal, Pen Telephone, undated.

Widrow et al., IEEE 1975, vol. 63, No. 12, Adaptive Noise Cancelling: Principals and Applications, pp. 1692–1716.

HOME AGENT

SKETCHING UNIT FOR TRANSMISSION OF SKETCHES AND NOTES OVER NORMAL TELEPHONE LINES

This is a continuation of U.S. patent application Ser. No. 08/369,764, filed Jan. 6, 1995, now U.S. Pat. No. 5,719,923, which was a continuation-in-part of U.S. patent application Ser. No. 08/076,505, filed on Jun. 14, 1993, now U.S. Pat. No. 5,448,555.

FIELD OF THE INVENTION

This invention relates to the transmission of sketches and notes over normal telephone lines, and more particularly, to a sketch pad unit for use with a telephone for simultaneously transmitting voice analog signals and sketch digital signals.

DESCRIPTION OF THE RELATED ART

It is often difficult to communicate directions, ideas and graphical related concepts using a telephone in comparison to the ability to convey this type of information in person by explaining the graphical related concept using a drawing. For example, the ability to draw a map for providing travel directions is likely to save time and energy instead of describing the directions in words over the telephone and having the person receiving the verbal directions draw the map from the verbal description.

Some sketch pads are available which generally transmit the graphical data over a telephone line in a manner which is unsuitable for use in conjunction with a telephone. For example, various delays in the transmitting and receiving of the graphical data to sketch units are encountered during a voice communication. In addition, the user interface for the sketch user is unsuitable for use for two sketch users communicating with each other from opposite ends of a telephone line.

Examples of prior art transmission techniques which have encountered significant delays when analog voice and digital data is transmitted simultaneously over a channel is typically either frequency-division multiplexing or time-division multiplexing. In frequency-division multiplexing, the data channel and the voice channel are allocated different sub-bands of the channel's bandwidth. Examples of these techniques are U.S. Pat. No. 4,757,495, U.S. Pat. No. 4,672,602, and U.S. Pat. No. 4,546,212. In time-division multiplexing arrangements, voice signals are sampled, digitized and interleaved with digital data to form a single information stream which is communicated over the available channel. Practically every digital carrier system (e.g. the T1 carrier system) is an example of time-division multiplexing.

U.S. Pat. No. 4,512,013, issued Apr. 16, 1985, presents an interesting approach that is close to a frequency division multiplexing arrangement for simultaneous voice and data transmission. The arrangement filters the speech signal and adds thereto a modulated narrowband signal to form the transmitted signal. The narrowband modulated signal derives from a narrowbauid digital input signal that is modulated with a carrier, thereby shifting the narrow-band up in frequency to a position in the spectrum where there is little speech energy. At the receiver, in reliance of the fact that the speech power is low in the narrowband occupied by the modulated digital signal, the digital signal is recovered through appropriate demodulation. Thereafter, the recovered digital signal is demodulated to replicate the transmitter's operation, adaptively filtered to account for channel characteristics, and subtracted from the received signal. The result is the received speech. As indicated above, one salient characteristic of that arrangement, as stated in col. 2, lines 13–18, is that " . . . an entire analog speech signal and a modulated data signal are capable of being transmitted over a normal analog channel by the multiplexing of the data signal within the portion of the normal analog speech signal frequency band where the speech signal is present and the power density characteristic thereof is low". As an aside, the Pat. No. 4,512,013 arrangement is half duplex.

Additional techniques for transmitting digital data, e.g., data output from the sketch unit, is found in the modem art where digital information is communicated over a channel by converting the digital information to analog form. In the most basic form, a modem filters the digital signal (i.e., shifts the signal in frequency) to form a band-limited signal and modulates the signal to reside within the passband of the communication channel. In telephony, for example, that passband may be between 300 Hz and 3500 Hz. To increase the information-carrying capacity of the modulated signal, more sophisticated modems employ quadrature modulation. Quadrature modulation is often depicted as a two-dimensional signal space. Use of the signal space to send voice information is disclosed in U.S. Pat. No. 5,081,647 issued Jan. 14, 1992.

Additionally, use of the signal space to send digital data, e.g., sketch data, and analog data, e.g., voice data is described in "High Speed Digital and Analog Parailel Transmission Technique Over Single Telephone Channel", Ajashi et al., IEEE Transactions on Communications, Vol. 30, No. 5, May, 1982, pp. 1213–1218. Unlike prior techniques, where analog and digital signals were segregated into different time slots (TDM) or different frequency bands (FDM), they describe separating analog and data signals into the two different channels of the QAM system. That is, Ajashi et al. suggest modulating the in-phase channel with the analog signal, and modulating the quadrature channel with the digital signal. Building on that description and concerning themselves with channel equalization, Lim et al. analyzes equalizer performance in "Adaptive Equalization and Phase Tracking For Simultaneous Analog/Digital Data Transmission", BSTJ, Vol. 60 No. 9, November 1981, pp. 2039–2063. (The 1981 BSTJ article cites the information of 1982 IEEE article as "unpublished work").

However, currently, there does not exist a suitable user interface which permits a sketch user to effectively communicate graphical data with another sketch user. In addition, there does not exist a suitable method for simultaneously transmitting voice and sketch data over a normal telephone line so that the sketch users may create and modify graphical data in an acceptable manner. More specifically, no one has achieved the ability to simultaneously sent both digital and analog signals (e.g., sketch and voice data) through both channels of a QAM system, and no one has achieved the ability to communicate both by data and analog, simultaneously, and in full-duplex, over a single bi-directional band limited communications channel.

SUMMARY OF THE INVENTION

Accordingly, it is an object of the present invention to provide a sketch unit which includes a user interface which is friendly and permits users of the sketch units to communicate with each other in an efficient and timely manner.

In addition, it is another object of the present invention to eliminate the delay encountered when transmitting voice and sketch data over a telephone line.

Further, it is an object of the present invention to implement the transmission of analog and digital information, simultaneously, and in full-duplex, over a single bi-directional band limited communications channel.

These and other objects of the present invention are accomplished by providing a sketching system that sketches first notes to be transmitted over a telephone line during a telephone call using the telephone line, and the sketching system receives second notes from another sketching system. The sketching system includes a sketching unit having a note generating device for generating the first notes. The sketching system also includes a signal de-combiner device, receiving the second notes from the another sketching system and voice data as a combined signal via the telephone line and de-combining the combined signal into the second notes and the voice data. The sketching unit is connected to the signal de-combiner. The sketching unit includes a note displaying device displaying the first and second notes, the note generating device generating the first notes, and a processor connected to the note displaying and generating devices and to the signal de-combiner, receiving the first notes from the note generating device, receiving the second notes from the signal de-combiner, and transmitting the first and second notes to the note displaying device. The sketching unit further includes a clearing unit selectively clearing one of the note displaying device and another note displaying device of the another sketching system and an erase unit selectively erasing the first and second notes displayed on one of the note displaying device and the nother note displaying device. Finally, the sketching system includes a first lock device selectively preventing the processor from transmitting the first notes to the signal de-combiner preventing the first notes from being displayed on the another sketching system, and a second lock device for selectively preventing the processor from transmitting the second notes to the note displaying device.

Each sketching system preferably includes the ability to receive combined voice analog data and digital data signals from other sketching systems and the ability to transmit the combined signal to other sketching systems.

According to another aspect of the sketching unit of the present invention, the de-combiner includes a demodulator receiving the combined signal and outputting a demodulated signal and a detector receiving the demodulated signal from the demodulator and for detecting digital signal components included in the demodulated signal. In addition, the de-combiner includes a first de-mapper connected to the detection means and generating the first notes responsive to the digital signal components, subtraction means for subtracting the digital signal components received from the detection means generating component analog signals and a second de-mapper connected to the subtraction means and generating the voice signal responsive to the component analog signals.

According to the simultaneous communication aspect of the present invention, analog information and digital information is communicated concurrently when employing the principles of this invention. In general terms, when the communication channel is viewed as a multi-dimensional space, the digital signal is divided into symbols, and the symbols are mapped into the signal space with a preset distance between them. The analog signal, generally limited in magnitude to less than half the distance separating the symbols, is converted to component signals and added (i.e., vector addition) to the symbols. The sum signal is then transmitted to the receiver where the symbols are detected and subtracted from the received signal to yield the analog signal components. The transmitted analog signal is recreated from those components.

In one illustrative embodiment for the simultaneous transmission of digital and analog data, the digital stream entering the transmitter section is divided into words, and each word is mapped to a pair of symbol components. The analog signal entering the transmitter section is sampled and each pair of successive samples forms a set of analog vector components. The analog vector components are added, respectively, to the symbol components and the component sums are QAM modulated to form the output signal. The pairs of analog samples can be derived by simply delaying the analog signal and sampling both the delayed and the undelayed versions.

At the receiver, the signal is first demodulated and the digital signal is detected in accord with standard modulation technology. The detected digital signal is then subtracted from the received signal to form analog sample pairs that are combined to reconstitute the analog signal.

Line equalization, echo-canceling, pre-emphasis, and other improvements that are known in the modem art can be incorporated in various embodiments that employ the principles of this invention.

DETAILED DESCRIPTION

Figure 1:
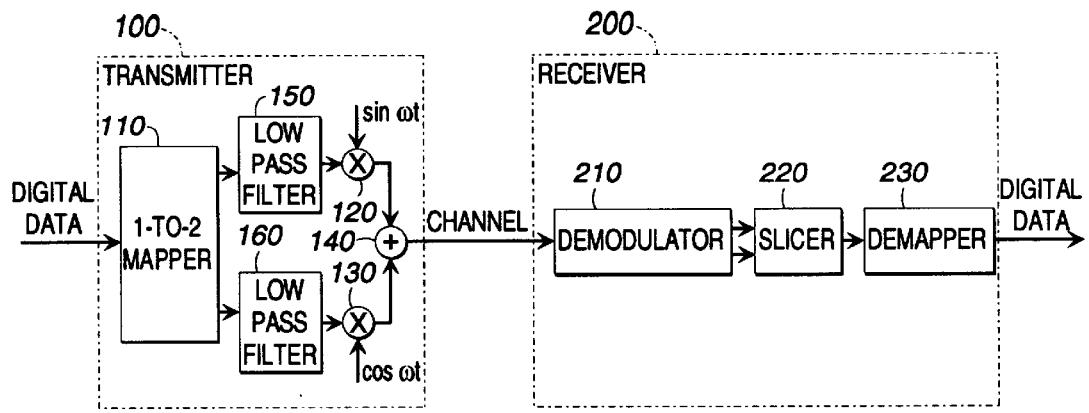
FIG. 1 presents the basic structure of a prior art modem.

To place this disclosure in context, FIG. 1 presents a very basic block diagram of a modem that communicates digital data via quadrature modulation techniques. Section 100 is the modem's transmitter section and section 200 is the modem's receiver section. Specifically, in the transmitter section digital data is applied in FIG. 1 to a 1-to-2 mapper 110, and mapper 110 develops two outputs which typically are referred to as the in-phase and quadrature samples. The in-phase samples are applied via low pass filter 150 to modulator 120, which multiplies the applied signal by a carrier—i.e., sin ωt in FIG. 1. The quadrature samples are applied via low pass filter 160 to modulator 130, which multiplies the applied signal by a second carrier. The second carrier is orthogonal to the first carrier; namely, cost ωt. Filters 150 and 160 must be bandlimited to no more than ω, in order to avoid aliasing and to at least half the inverse of the output sample rate of mapper 110. The output signals of modulations 120 and 130 are added in element 140 to develop the analog signal of the modem's transmitter section.

In operation, the digital data applied to the FIG. 1 apparatus is a stream of bits. Element 110 views the incoming signal as a stream of symbols that each comprises a preselected number of consecutive bits, and maps each symbol into an in-phase analog sample and a quadrature analog sample.

Figure 2:
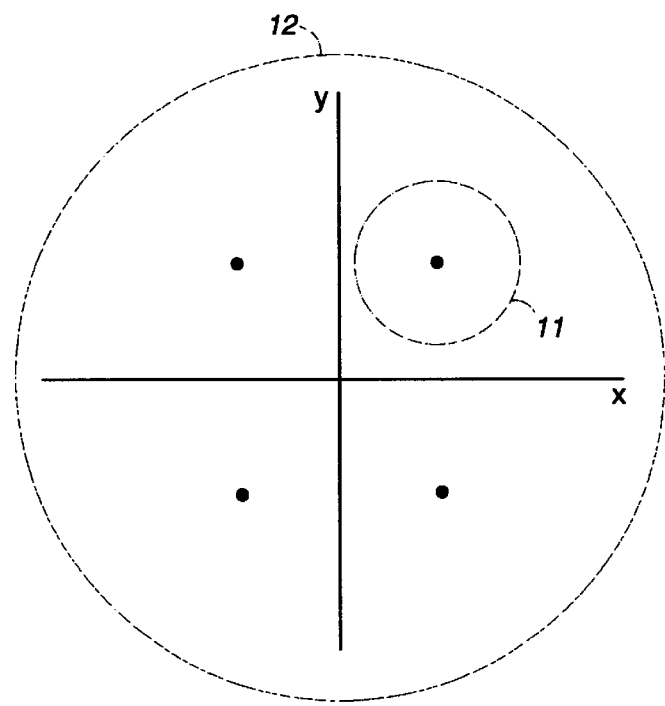
FIG. 2 shows the signal space and an illustrative signal constellation for the FIG. 1 system.

Practitioners in the art often describe the operations performed in the FIG. 1 apparatus by means of a signal space diagram, such as shown in FIG. 2. The x axis corresponds to one of the carrier signals (e.g. cos ωt) and the y axis corresponds to the other carrier signal (sin ωt). The in-phase and quadrature samples delivered by element 110, in effect, specify a location in the signal space of FIG. 2. Accordingly, the set of possible samples that element 10 can produce corresponds to a set of sample points (i.e., a constellation of points) in the signal space depiction of FIG. 2. A 4-point signal constellation is shown, by way of illustration, in FIG. 2. It is well known, however, that one can create signal point constellations with a larger number of signal points.

To receive signals that were modulated by the FIG. 1 apparatus in accordance with the specific constellation depicted in FIG. 2, one must only identify whether the received signal is in the first, second, third or fourth quadrant of the signal space. That means that there exists great latitude in the signals that are received, and any received signal that is still in the correct quadrant is mapped to the correct constellation signal point in that quadrant. Extended to other (and perhaps larger) constellations, the signal space can be divided into regions and the receiver's decision is made with respect to the region in which the received signal is located. We call these regions "neighborhood" regions.

Returning to FIG. 1 and addressing the modem's receiver section, the modulated signal is applied to demodulator 210. Demodulator 210 recovers the in-phase and quadrature components and applies them to slicer 220. Slicer 220 converts the in-phase and quadrature components into symbols and applies the symbols to demapper 230. De-mapper 230 maps the symbols into bit streams to form the recovered digital data stream.

Absent any signal degradation (such as due to noise added in the channel) the signal received by demodulator 210 would be precisely the same as the signal sent by adder 140, and a determination of neighborhood regions in which the signal is found (by slicer 220) would be relatively simple and error-free. However, noise that is added to the transmitted signal shifts the received signal in the signal space and modifies the input to slicer 220. Stated in other words, a noise signal that adds to the signal flowing through the communication channel corresponds to a vector signal in the signal space of FIG. 2 that is added to a transmitted sample point. The added vector is of unknown magnitude and unknown phase. Consequently, added noise converts a transmitted signal that corresponds to a point in the signal space into a region in the signal space. This phenomenon is depicted in FIG. 2 by circle 11. Some refer to this circle as a signal space "noise cloud" surrounding the transmitted signal.

From the above it is clear that in order to detect the transmitted signals without errors, the neighborhood regions must be large enough to encompass the noise cloud. Since the average power of the sent signal is typically limited by other considerations, the extent to which the signal constellation covers the infinite space represented by the x and y axes is also limited. This is represented in FIG. 2 by circle 12. The restriction imposed by circle 12, coupled with the restriction on the size of the neighborhood regions that is imposed by noise considerations limits the number of transmitted signal points in the constellation.

As indicated above, it has been observed that in typical modem designs the allowable signal power and the expected fidelity of the channel combine to control the constellation size. Less noisy channels allow for larger constellations, and larger constellations permit higher digital data throughput.

Figure 3:
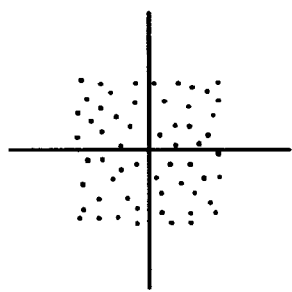
FIG. 3 shows the signal space of a QAM analog system.

The present invention utilizes a revolutionary method of transmitting and receiving data which directly contrasts with the previously mentioned prior art method. Specifically, the present invention utilizes all or essentially all, of the available signal space for the transmission of information. A transmitter signal space in accordance with this revolutionary approach is depicted in FIG. 3 where a plurality of signal points are depicted randomly within the signal space. These points are illustrative of the various vectors that the transmitter is allowed to send out. There are no more "constellations of points", where a decision must be made between constellation points; there is only the entirety of the signal space. In other words, rather than having digital signals that are mapped onto a fixed constellations within a signal space, FIG. 3 depicts analog symbols that are mapped onto a signal space. When the analog signals that form the in-phase component are independent of the analog signals that form that quadrature component, the viable signal space of FIG. 3 may be rectangular.

Having recognized the advantages of sending analog signals in accordance with the signal space of FIG. 3, the next innovation is to alternate between the signal spaces of FIG. 2 and FIG. 3. That is, the innovation is to send the customer analog signals or the customer digital signals as the need arises. This is depicted in FIG. 4.

Figure 4:
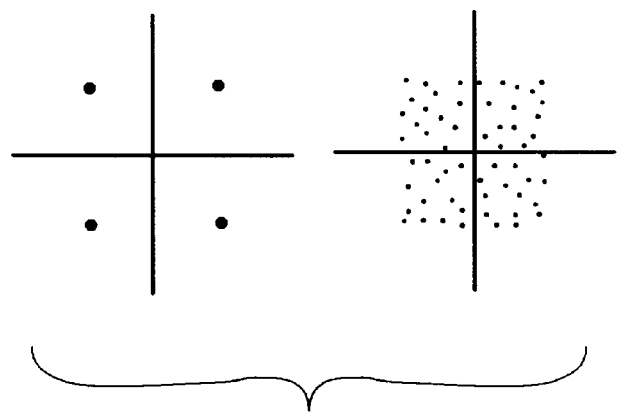
FIG. 4 shows the signal space of an alternating digital and analog system.

Further, having recognized the advantages of sending either analog or digital signals in accordance with the signal spaces of FIG. 4, it was discovered that a totally different communication approach can be taken, that communicating both analog and digital signals, can be expressed concurrently, in a combined signal space. This is illustrated in FIG. 5, where four neighborhoods are identified for illustrative purposes, with demarcation borders identified by dashed lines 21 and 22.

Figure 5:
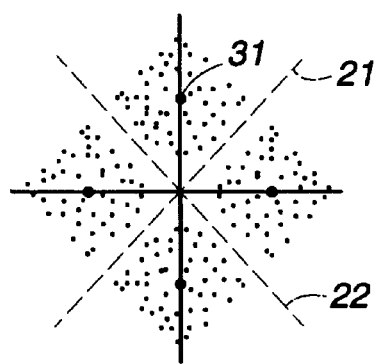
FIG. 5 shows the signal space of a combined digital and analog system.

According to the FIG. 5 depiction, the analog signals that form "signal clouds" around each digital constellation point (e.g., point 31) should be restricted in their dynamic range to be totally contained within the neighborhood regions. Hence, here too there is a trade-off between constellation size (which directly affects digital through-put) and dynamic range of the transmitted analog signal (which is some situations translates to "resolution").

Figure 6:
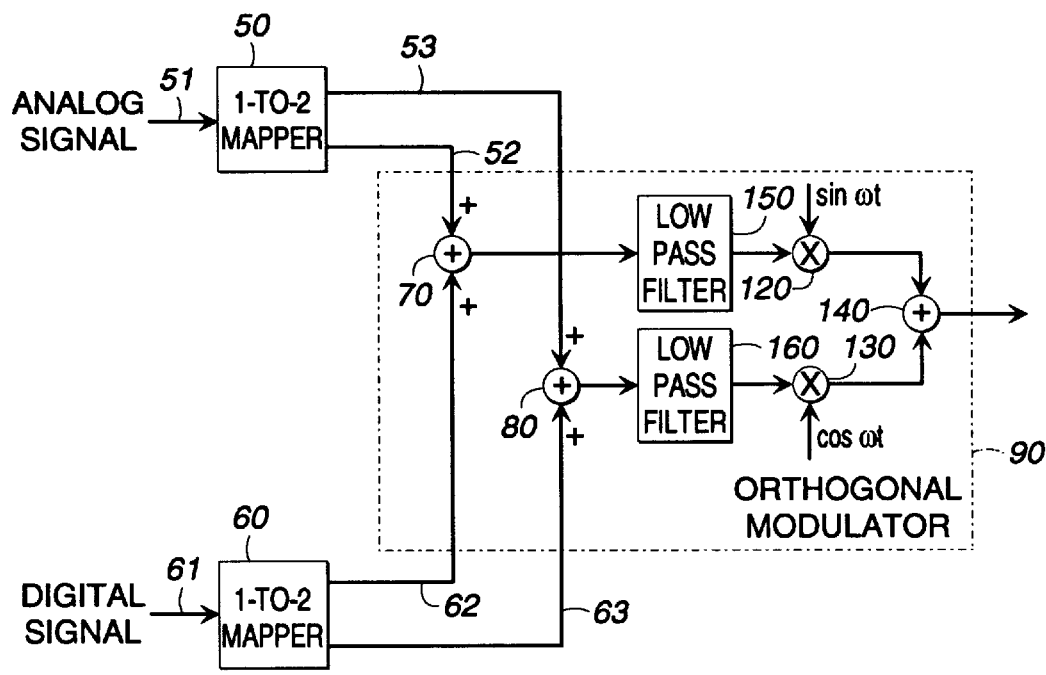
FIG. 6 presents one embodiment of a transmitter section for a combined digital and analog system.

FIG. 6 depicts an arrangement that very basically illustrates the principles disclosed herein. It includes a 1-to-2 dimensional mapper 60 responsive to digital signals applied on line 61. Mapper 60 develops two output signals on lines 62 and 63, each of which possesses pulses with quantized amplitudes that relate to the digital signals arriving on line 61. FIG. 6 also includes a 1-to-2 mapper 50 that responds to an applied analog signal on line 51, and it develops two output signals on lines 52 and 53, each of which possesses pulses with continuous amplitudes that relate to the analog signal on line 5. Outputs 52 and 62 are combined in adder 70 and outputs 53 and 63 are combined in adder 80. The outputs of adders 70 and 80 form the components of the signals that are represented by the signal space of FIG. 5. As in FIG. 1, the outputs of adders 70 and 80 are applied via low pass filters 150 and 160 to modulators 120 and 130 and summed in adder 140 to form a modulated signal as is typically known in the modem art.

In FIG. 6 element 60 is depicted as a 1-to-2 mapper. However, it should be understood that element 60 can be an M-to-N mapper. That is, element 60 can be responsive to a plurality (M) of digital signals and it can develop a different plurality (N) of output signals. Similarly, element 50 can be a J-to-K encoder that is responsive to a plurality of analog signals. Likewise, the collection of elements that follow elements 50 and 60 (i.e., elements 70, 80, 120, 130, 140, 150 and 160), which form orthogonal modulator 90 can be constructed to be responsive to whatever plurality of outputs that elements 50 and 60 are designed to produce (e.g., three dimensional space, four dimensional space, etc.). More specifically, those elements must account for all of the applied input signals, and that means that they must be able to handle K or N signals, whichever is larger. In such a circumstance, however, the user can assume that the larger of the two (K or N) is the dimensionality of the system, and some of the dimensions have either no digital data, or no analog data, whichever applies. Of course, if there are "dimensions" for which there is no digital or analog data, other information can be sent over those dimensions, such as equalization "side" information.

Figure 7:
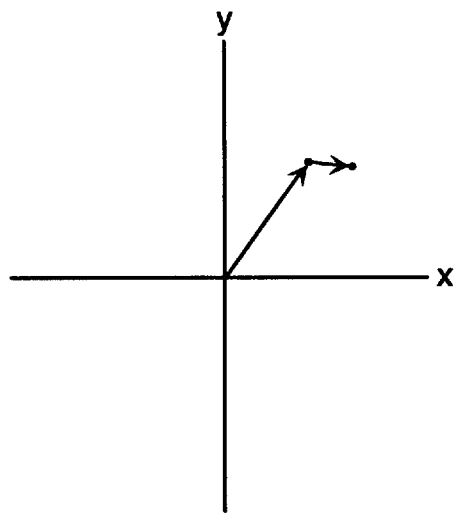
FIG. 7 depicts the vector addition that forms the signal space of FIG. 5.

In the context of a signal space, the N pluralities of output signals of elements 50 and 60 (assuming N is larger than K) correspond to the collection of components of vectors in multi-dimensional space; e.g., N-dimensional space. The coordinates of this multidimensional space correspond to the orthogonal modulation signals within orthogonal modulator 90. IN FIG. 6, the two orthogonal modulation signals are cos ωt and sin ωt, but other modulation signals are also possible; for example, code division multiplexing (CDMA) templates. For purposes of this disclosure, orthogonal modulation signals are modulation signals that develop a transmitted signal comprising concurrent element signals and yet allow the receiver to separate the received signal into its constituent element signals, those being the signals developed in response to each of the modulation signals. It may also be observed that, relative to FIG. 5, orthogonal modulator 90 performs vector summation of the symbol vector represented by the components developed by element 60 with the analog information vector represented by the components developed by element 50. This is depicted in FIG. 7.

Figure 8:
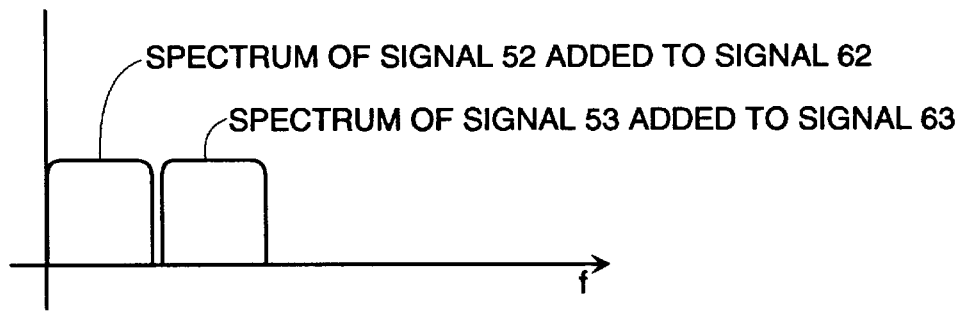
FIG. 8 presents one orthogonal modulation approach.

In connection with FIG. 1, it may be noted that the principles disclosed herein may be utilized even when the output signals of adders 70 and 80 are communicated (e.g., transmitted) directly, without the benefit of combining them in orthogonal modulator 90. Also, orthogonal modulator 90 can simply be a bandshifting means. To the extent that the output of adder 70 (for example) is bandlimited, the output of adder 80 can be shifted beyond the band-limited output signal of adder 70 and combined with the output signal of adder 70. This is presented in FIG. 8. It may also be appreciated that the principles disclosed herein may be exercised without the use of element 60 in those situations where no digital streams are presented.

To this point in the instant disclosure, the implication has been that the input signal applied to element 50 of FIG. 6 is analog. However, that does not have to be strictly the case. In accordance with conventional techniques, an analog signal that is bandlimited can be sampled (within the proper Nyquist bounds). Hence, it should be understood that the input signal to element 50 can be a sequence of analog samples. Moreover, a sampled analog signal can be quantized and represented in digital form. Indeed, an analog signal that has been sampled and converted to digital form can then be converted to amplitude quantized pulse amplitude-modulated format; e.g., conventional PCM. All of those representations are representations of an analog signal. For example, the collection of the amplitude-quantized PAM pulses is identical to the original analog signal within the bounds of the quantization errors introduced by the sampling and quantizing (A/D conversion followed by D/A conversion) processes.

The fact that sampling and amplitude quantization of the analog signal at the input of element 50 is permitted offers a number of benefits. For one, it allows the signal to be presented to element 50 in digital format. For another, it permits simple multiplexing of different information sources. Thus, for example, elements 50, 60 and 90 can be implemented in accordance with present day modem realizations; i.e., with one or more microprocessors operating under stored program control.

Figure 9:
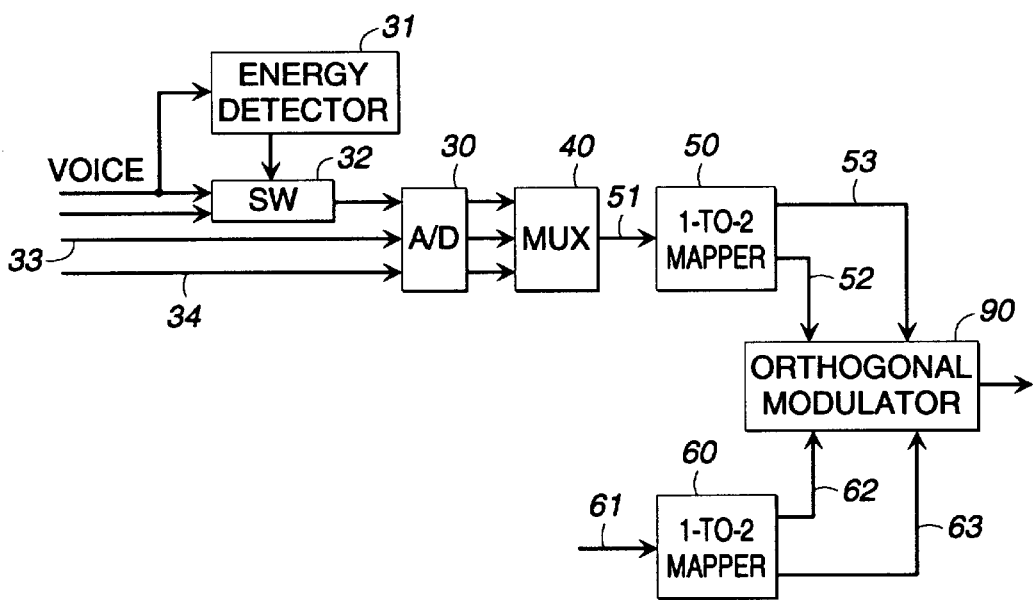
FIG. 9 illustrates the arrangements that permit more than one analog signal source to be transmitted simultaneously.

An example of input signal multiplexing is shown in FIG. 9, which presents an embodiment that includes an A/D converter bank 30 followed by a multiplexer 40. Converter bank 30 converts a plurality of analog signals, such as on lines 33 and 34, to digital format and multiplexer 40 multiplexes its input signals and applies them to element 50. Elements 30 and 40 are conventional A/D and multiplexer elements, respectively.

The combination of elements 30 and 40 allows applying a number of narrowband analog signals to orthogonal modulator 90. The primary limitations are the carrier frequency and the allowable transmission bandwidth of the channel. The narrowband signal can, of course, come from any source. For example, a system installed in an ambulance may sacrifice some voice bandwidth in order to allow narrowband telemetry data of blood pressure and heart pulse rate to be communicated concurrently with the voice.

Additionally, a voice signal energy detector may be included, such as disclosed in U.S. Pat. No. 5,081,647, which would detect periods of silence and send less urgent telemetry data during those silence periods. The silence periods may be naturally occurring periods, or silence periods enforced for the purpose of communicating telemetry information, such as data about the analog information just sent or about to be sent. This is illustrated by elements 31 and 32 in FIG. 9.

The fact that the input to element 50 is digital (in a digital implementation of elements 50, 60 and 90) and that the input to element 60 is also digital should not be confused. The digital input to element 60 is a stream of digits that are each equally important. Hence, those digits are converted into symbols and the symbols into constellation points, and the constellation points are within neighborhoods which are identified by a slicer (e.g., slicer 220 in FIG. 1) within a modem's receiver section. In contradistinction, the digital signals applied to element 50 correspond to digital words that represent amplitude, and the specific interrelationship between adjacent bits of the digital words is maintained. As indicated above, being a fundamental distinction, the signal cloud around a signal point within a constellation does not represent a plurality of signal points that must be distinguished.

Figure 10:
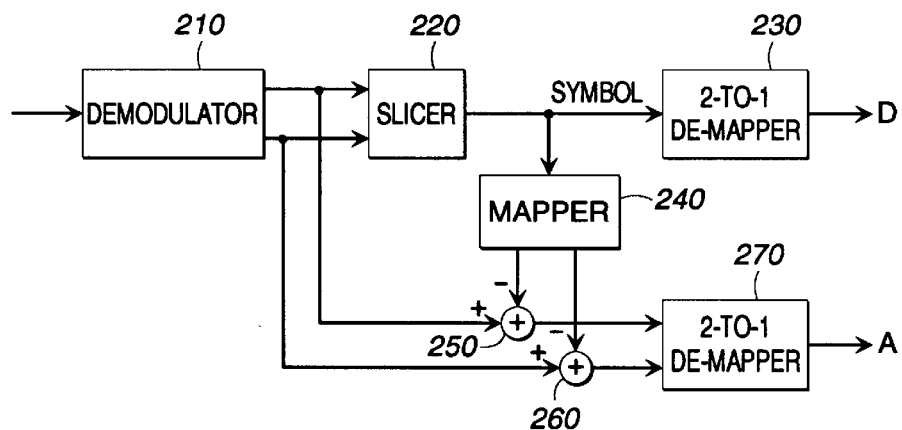
FIG. 10 details the major elements in a receiver responsive to the FIG. 5 signal space.

FIG. 10 represents a basic block diagram of a modem's receiver section in conformance with the principles disclosed herein. The modulated input signal received from the channel is applied to demodulator 210 which develops the in-phase and quadrature components. Those are applied to slicer 220 which identifies the symbols, and the symbols are applied to de-mapper 230. All this is in accord with conventional modem approaches, as described in connection with FIG. 1. In addition, FIG. 10 includes a mapper 240 that is responsive to the symbols developed by slicer 220. The output of mapper 240 is an accurate estimate of the set of in-phase and quadrature components (that are applied in the FIG. 1 arrangement to elements 150 and 160). The outputs of mapper 240 are subtracted from the output of demodulator 210 in subtractors 250 and 260. The outputs of subtractors 250 and 260 are applied to 2-to-1 de-mapper 270 which recombines the analog samples to form an estimate of the original analog signal. De-mapper 270 performs the inverse function of mapper 50.

It may be noted that slicer 220 can be designed to directly provide the output signals that mapper 240 develops; and moreover, de-mapper 230 can be made responsive to such signals. That would alter the FIG. 10 in the sense that slicer 220 and mapper 240 would combine to form a single element and de-mapper 230 as well as adders 250 and 260 would be responsive to that combined element.

In analog realizations (e.g., FIG. 6), mapper 50 is responsive to analog signals. Various approaches can be taken to develop the plurality of outputs (two outputs, in the case of element 50 shown in the FIGS.). For example, a single bandlimited analog signal can be divided into a plurality of baseband signals by simply filtering and modulating selected sub-bands. Alternatively, element 50 can accept a plurality of bandlimited analog signals and assign each of the plurality of bandlimited analog signals to different outputs of element 50.

In time sampled realizations (whether the realization continues with analog circuitry or digital circuitry), element 50 can simply route alternate samples of a single analog signal to different outputs of element 50, or multiplex a plurality of analog signals and distribute the samples of those signals in any convenient manner.

In order to allow for nonlinear techniques that may be employed to enhance the communication qualities, it is important to effect equalization of the channel in order to minimize intersymbol interference. Conventional modem technology can be brought to bear to this need.

Figure 11:
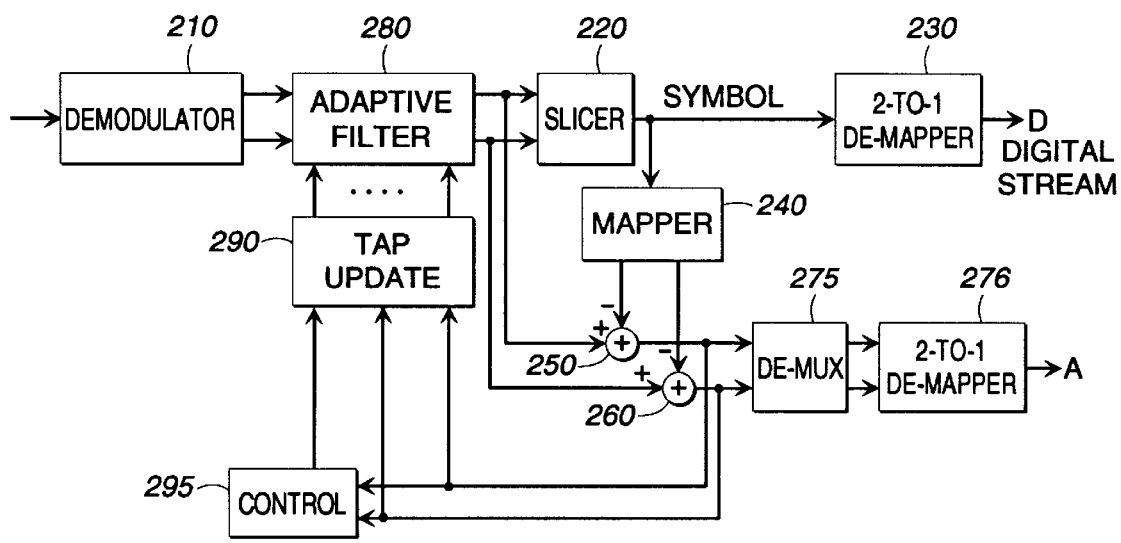
FIG. 11 presents a block diagram of a receiver that includes adaptive equalization.

FIG. 11 presents a block diagram of an arrangement that incorporates equalization. Specifically, FIG. 11 is depicted with a modulator that is followed by equalization hardware (which together can be thought of as a super-demodulator). The equalization hardware comprises an adaptive filter 280 that is interposed between demodulator 210 and slicer 220. The operational characteristics of filter 280 are controlled by filter coefficients that are stored—in modifiable form—within tap update block 290. Tap update block 290 is responsive to the output signals of subtractors 250 and 260. The adaption of filter 280 is carried out in accordance with conventional modem techniques. The outputs of subtractors 250 and 260 are also applied to demultiplexer 275 and the outputs of demultiplexer 275 are applied to demapper 276. De-mapper 276 comprises a bank of de-mappers 270 of FIG. 10. Elements 275 and 276 are included to illustrate a receiver that is adapted for applications where a plurality of analog inputs are multiplexed. Of course, in applications where there is no multiplexing, de-mapper 270 can be substituted.

In accordance with some adaptation approaches, it is easiest to carry out adaptation and the corresponding coefficient updates when the power in the analog signal is small. To limit the process to such intervals, FIG. 11 includes a power detector within control element 295 that is responsive to subtractors 250 and 260. Block 295 is also conventional. It includes a power detection circuit that evaluates the power contained in the signals of subtractors 250 and 260 and delivers a control signal to block 290 to enable (or disable) the coefficient updating process. Of course, block 295 may be more generic, in that the control signal can be derived from other than the analog signal, such as from side information from the transmitter.

FIG. 11 depicts one arrangement for effecting equalization of the transmission channel between a sending modem's transmitter section and a receiving modem's receiver section; to wit, at the receiver's front end, following the demodulator. However, it is well known that equalization can be performed anywhere along the channel, going back even to within a modem's transmitter section.

Figure 12:
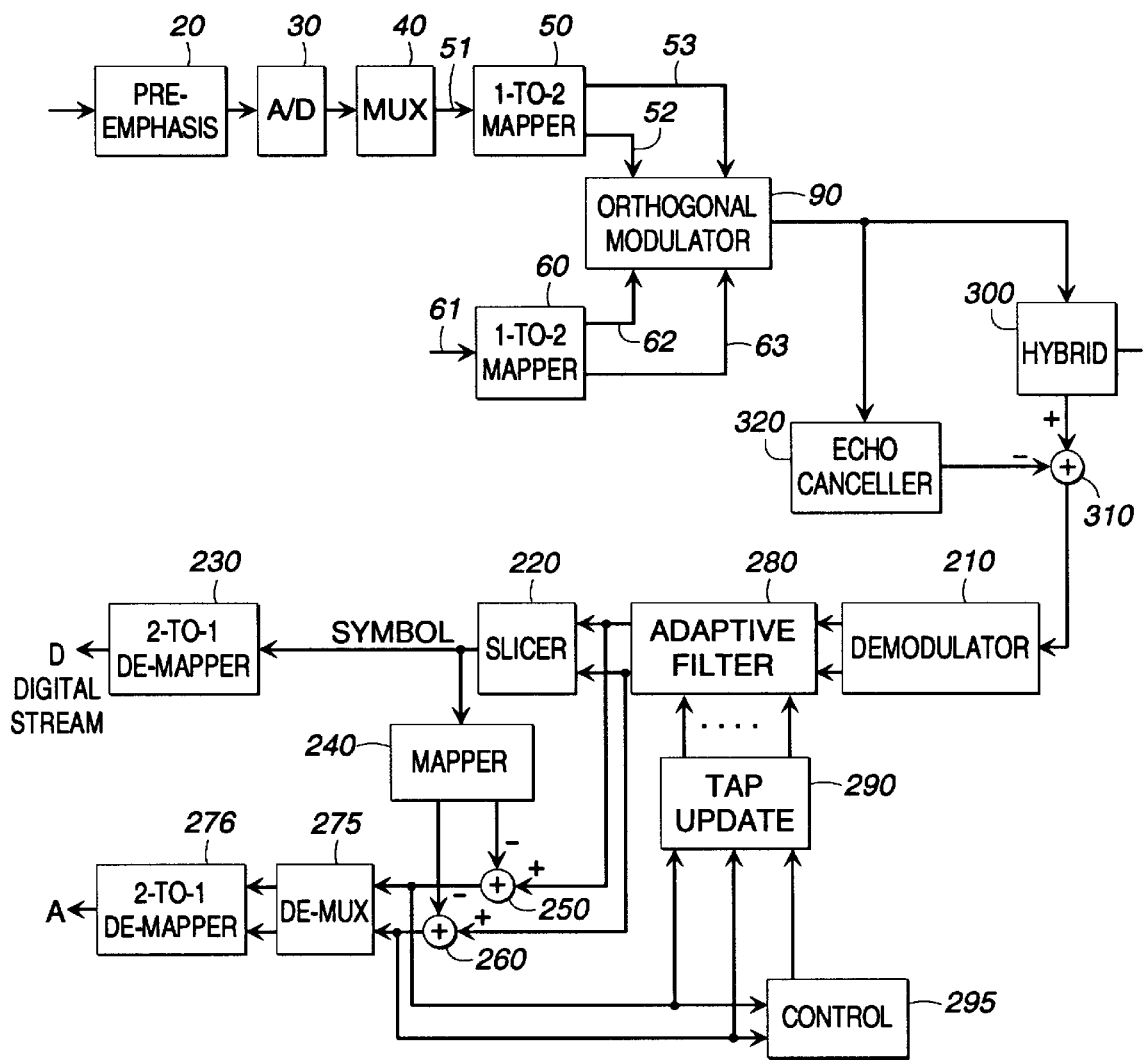
FIG. 12 presents the block diagram of an entire modem.

FIG. 12 depicts the entire, full duplex, modem constructed in accordance with the depictions of FIGS. 9 and 11. More specifically, a transmitter section (FIG. 9) is coupled with a receiver section (FIG. 11) through hybrid 300 and subtractor 310. Subtractor 310 cooperates with echo canceler 320 in the conventional way to subtract unwanted signals from the signal applied to demodulator 210. For sake of simplicity, echo canceler 320 is shown connected to the output of orthogonal modulator 90, and in analog embodiments of element 320 this is perfectly satisfactory. However, in digital embodiments it is well known that efficiencies can be realized by having the echo canceler be responsive to the outputs of mapper 60, where the signal rate is much lower.

Figure 13:
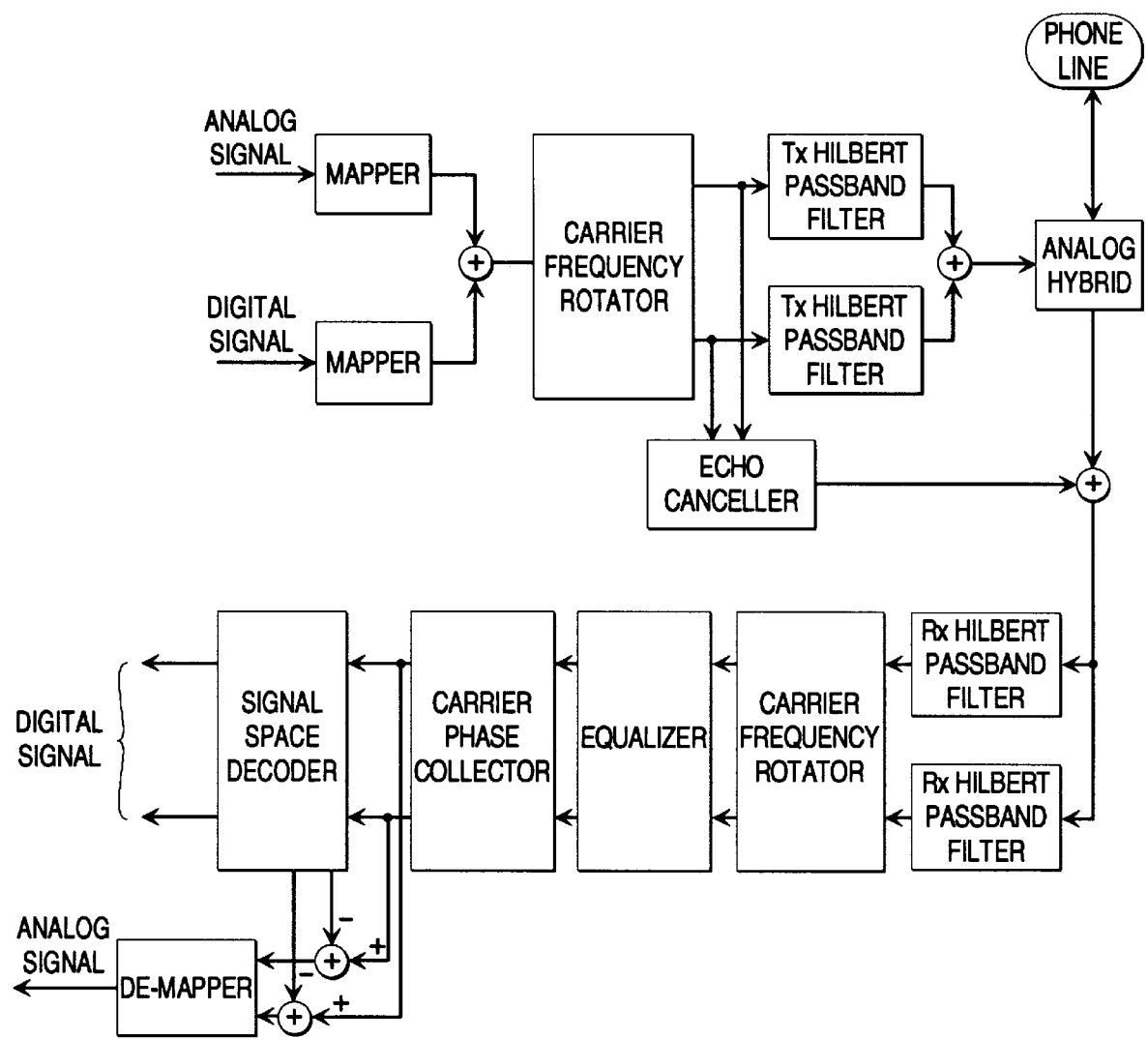
FIG. 13 presents a slightly different embodiment of the FIG. 12 mode.

An improvement which incorporates the principles disclosed herein is shown in FIG. 13. It may be noted that some of the elements in FIG. 13 are designated by different labels; such as "Hilbert passband filter", which corresponds to a modulator, etc. These are circuits that attain the desired results through somewhat different calculations and are well known to persons skilled in the modem art.

The echo canceling is performed, as in all modems, during a training period, when the far end signal source is silent and the echo canceler is adapted to minimize the output of subtractor 310.

Figure 14:
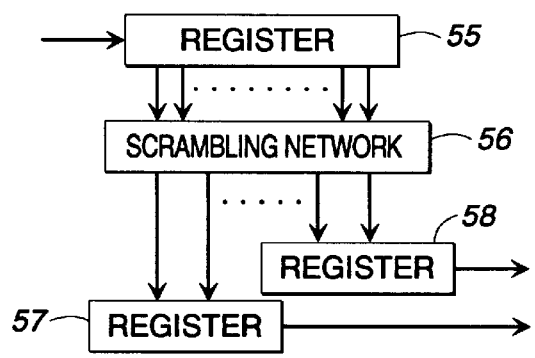
FIG. 14 depicts one structure for scrambling analog samples.

In connection with FIG. 6 it has been disclosed that the input to element 50 can be a sampled analog signal, as well as an unsampled analog signal. It has also been disclosed above that when element 50 is a 1-to-2 mapper (as compared to 1-to-N mapper) and the desired output of element 50 is pairs of a sampled analog signal, the pairs of analog samples can be derived by simply delaying the incoming analog signal by 1/B and sampling both the delayed and the undelayed versions at rate B. This provides sample pairs that correspond to adjacent samples of the original analog signal sampled at rate ½B seconds. Actually, privacy of the communication is enhanced when the samples are not adjacent, and FIG. 14 presents one approach for deriving pairs from non-adjacent samples. It basically includes an input register 55 for storing K analog samples that arrive at rate 2B, a scrambling network 56 that scrambles the outputs of register 55 and develops K outputs, and registers 57 and 58 that are responsive to the outputs of network 56. Registers 57 and 58 store K/2 analog samples every K/2B seconds and output the stored samples at rate ½B seconds. Scrambling network 56 may be simply a cross-connect field.

Figure 15:
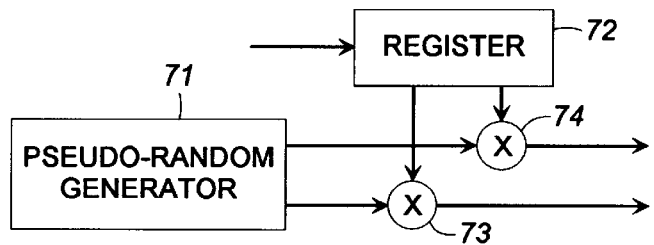
FIG. 15 presents a block diagram of a privacy scrambler employing pseudo-random multiplication of the analog samples.

Another approach for enhancing privacy entails modifying the gain and phase of the analog signals that are sent. This is akin to operating on, or transforming, the signal components that form the signal vector which is added to the constellation symbols. The transforming may be in accordance with the signal characteristics, or it may simply be following a pseudo-random sequence. The latter is depicted in FIG. 15, where register 72 receives analog signal sample pairs and directs each member of a pair to a different multiplier (73 and 74). Multipliers 73 and 74 modify the applied signal samples in accordance with corresponding coefficients that are received from pseudo-random generator 71, resulting in a pair of modified signal samples that are applied to mapper 50. Additional teachings of this technique are found in the U.S. Pat. No. 4,924,516, issued May 8, 1990, to G. Bremer and W. Betts.

Of course, the receiver ought to include a pseudo-random generator that is synchronized to generator 71 in order to properly decode the analog signal. The FIG. 15 circuit can be incorporated in a receiver (such as the FIG. 11 receiver) within the de-mapper that develops the analog signal. Synchronization of the FIG. 15 circuit in the receiver is achieved via synchronization information that is sent by the transmitter as "side information".

Figure 16:
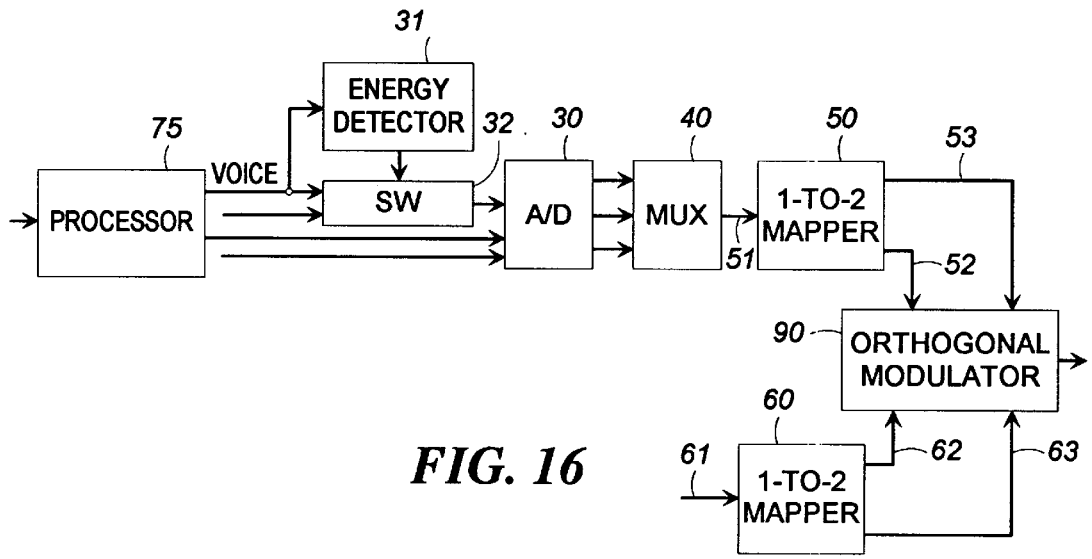
FIG. 16 illustrates a processor 75 being interposed between the analog input and the analog port of the modem, with the processor being adapted to carry out signal preprocessing functions, such as linear predictive coding.

Characterizing the enhancement more generally, modifying the input signal based on the input signal's characteristics is a general enhancement of the embodiments disclosed herein. The signal's amplitude, for example, can be dynamically modified to enhance the attainable signal to noise ratio. The dynamic scaling of the signal can be communicated to the receiver in the form of "side information" either on the digital channel, or on the analog channel (for example, via one of the channels described in connection with the FIG. 9 embodiment). This is depicted in FIG. 16, where signal processor 75 precedes switch 32. Processor 75 modifies the signal applied to switch 32 and also provides the aforementioned side information that is applied to A/D converter bank 30.

It may be noted in passing that some side information can also be included in the analog channel itself, by "stealing" some samples from the analog signal stream. Of course, with some realizations that would create missing samples at the receiver, but interpolation techniques at the receiver can create close estimates of the missing samples.

Still another way to modify the signal is to control its dynamic range through automatic gain control (AGC) which may be effected in conventional ways.

Yet another way to modify the signal is to encode it, and that includes, for example, the entire field of predictive encoding.

In predictive coding, the object is to predict the present signal from past signals and to transmit only the error, or residue, signal, that is, the signal that represents the deviation of the true signal from the predicted signal. It is expected, of course, that with good prediction the residue signal will be small. An arrangement that creates only small residue signals allows the residue signals to be amplified (in a fixed manner or dynamically), achieving thereby good signal resolution and high noise immunity.

The residue signal sample, e(n), is typically developed by the calculation:

$$e(n)=x(n)-a_1 x(n-1)-a_2 x(n-2)-a_3 x(n-3) \ldots$$

in response to input signal samples x(n), x(n-1), x(n-2), and for preselected coefficients $a_1$, $a_2$, $a_3$, . . .

It may be noted that the number of coefficients is a designer's choice, and that the number of coefficients can also be a function of signal characteristics. For some signal characteristics the number of coefficients may be two, for others it may be three, etc. Also, the values of the coefficients may be fixed (and set in accordance with historical determinations) or variable, based on considerations such as short term history of the signal, the current number of symbols in the constellation, etc.

Processor 75 of FIG. 16 may be employed to perform the selected encoding. More specifically, processor 75 may perform the function of a linear prediction coefficient generator that is sensitive to the characteristics of the input signal, and may also perform the function of the augmentation filter. The coefficients developed by the linear predictive coefficient generator portion of processor 75 delivers the coefficients as side information to the A/D converter block, to be transmitted to the receiver and used therein in accordance with the equation $$y(n)=e(n)+a_1 y(n-1)+a_2 y(n-2)+a_3 y(n-3) \ldots$$

Figure 17:
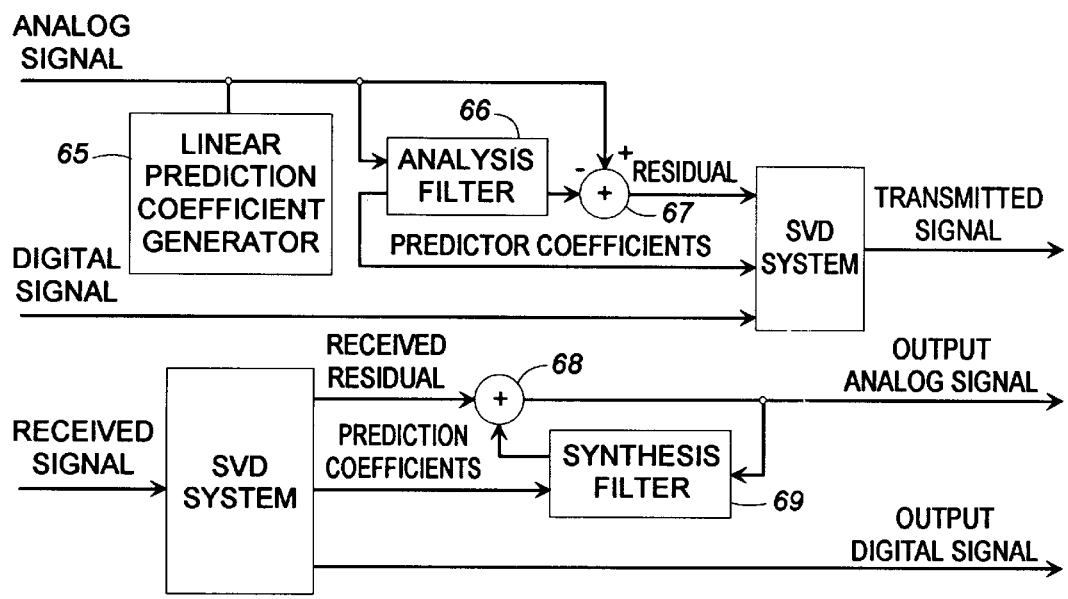
FIG. 17 presents a block diagram illustrating linear predictive coding.

FIG. 17 presents a block diagram of the transmitter and receiver portions that handle the linear predictive coding (elements 65–69). The blocks marked "svd system" represent the receiver and transmitter portions of the modem embodiments (svd modem) disclosed above (e.g. FIG. 13).

Yet another way to enhance operation is to employ pre-emphasis. For example, the "analog" input that enters orthogonal modulator 90 can be filtered to pre-emphasize the high frequencies and, correspondingly, the "analog" output of subtractors 250 and 260 can be filtered to remove the pre-emphasis. The pre-emphasis can be effected, for example, within the A/D converter 30 or even prior thereto, such as in pre-emphasis filter 20 shown in FIG. 12. The filtering can be done while the "analog" signal is truly analog, or it could be done when the "analog" signal is represented digitally—such as when the transmitter and receiver sections are implemented with digital hardware.

One aspect of the embodiments described above which employs a sampling process for the analog signal applied to mapper 50 is the limitation on the highest frequency that may be included in the applied signal in accordance with Nyquist's criteria. Stated in other words, regardless of the bandwidth offered by the communications network, a decision to sample the incoming signal at the symbol rate of mapper 60 places a limit on the upper frequency of the sampled signal. In some applications, such as in speech applications, it may be desirable to transmit higher frequency signals even if the cost of achieving the capability is a foregoing of some low frequencies.

This capability is realized by frequency shifting. That is, the speech signal is bandlimited, a preselected portion of the low frequency band is deleted, the resulting bandlimited signal is shifted downward, and the shifted signal is sampled.

These operations can be performed with conventional filtering and modulation circuitry or, alternatively, these operations can be performed with Hilbert filters. At the receiver, this process is reversed, of course.

A number of implementations described above require transmission of "side information" to the receiver. Also, as described above, this information can be sent on the analog channel or on the digital channel.

When the side information is sent on the digital data channel, it is embedded using DLE (Data Line Escape) shielding. More specifically, the side information is inserted in the data channel's bit stream while that channel's information is momentarily halted. In DLE shielding, the side information is preceded by a specific bit sequence known as the "command sequence", and may consist of either a fixed-length bit stream or a variable-length bit stream followed by a termination sequence. The command sequence indicates that the data to follow is side information and not main channel data.

Since any sequence of bits chosen for the command sequence could also appear in the customer data bit stream, a safeguard method is used to ensure the instances of the command sequence which do appear in customer data are not interpreted as true command sequences. In the transmitter, at the same point in the system where side information is embedded in the data stream, the input bit stream is monitored for instances of the command sequence in the customer data. At each point in the bit stream where an instance of the command sequence is detected, the transmitter inserts a duplicate sequence immediately following the original.

At the receiver, the input bit stream is again monitored for instances of the command sequence. If a command sequence is detected, the bit stream immediately following is checked for a duplicate instance of the same sequence. If such a duplicate is detected, indicating that the original sequence is in the customer data and not a true command flag, the receiver deletes the duplicate sequence from the data stream and continues monitoring. If, however, no duplicate is detected, the sequence is a true control flag. The receiver removes both the command sequence and the following side information from the main channel bit stream and routes the side information to its appropriate destination.

The method described above works regardless of how many instances of the command sequence are duplicated sequentially in the customer bit stream. Each instance is treated separately, with a duplicate instance inserted following the original. At the receiver, each pair of instances is treated separately, with the second in the pair discarded. As a result, if an even number of instances of the command sequence is detected following each other in the receiver, the output will consist of one half of the number of instances in the customer data stream and no side information. If an odd number n of instances is detected, the output will consist of (n−1)/2 instances in the output data stream and routing of side information in the receiver which is indicated by the last (unduplicated) command sequence.

Figure 18:
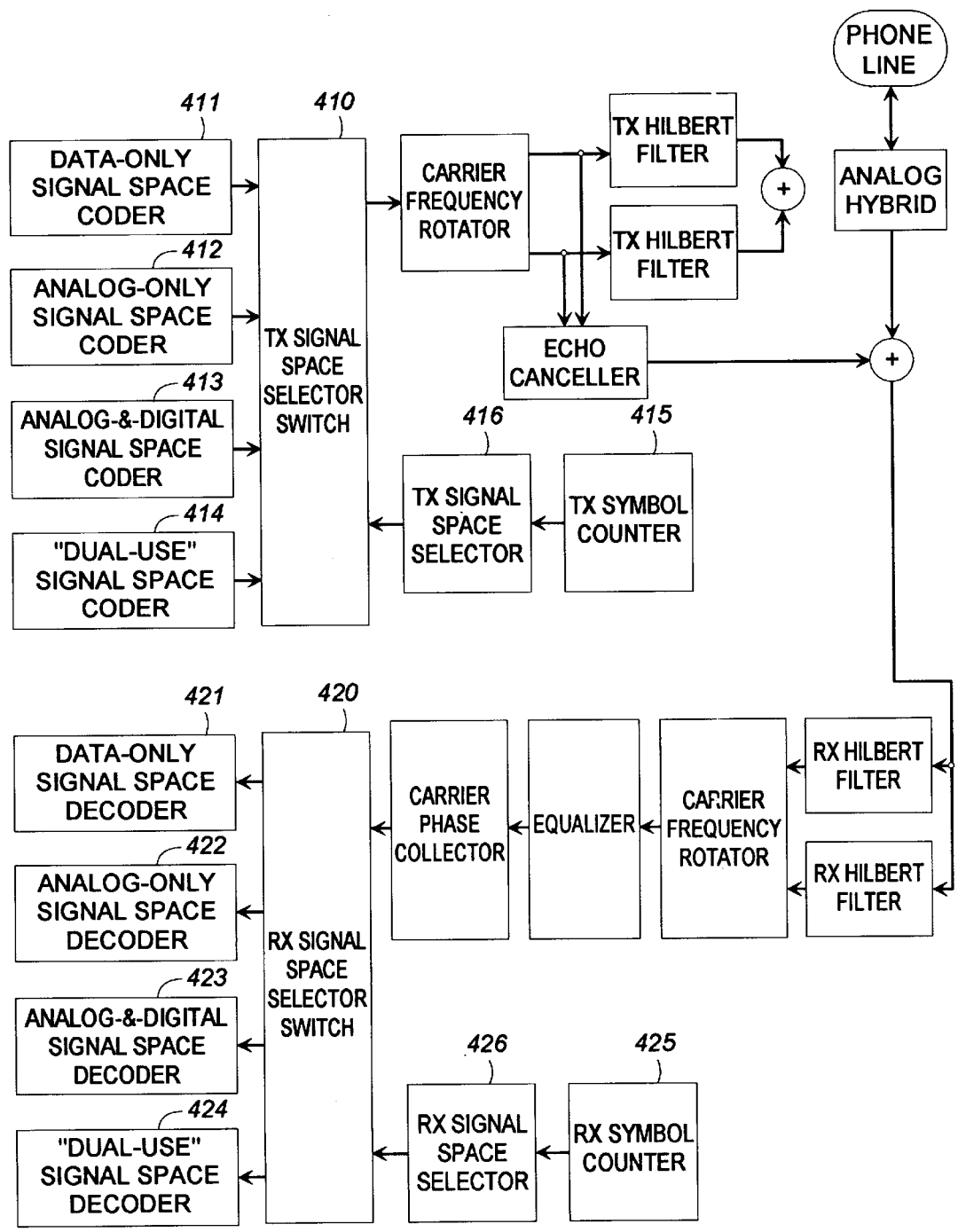
FIG. 18 presents a block diagram illustrating the alternative use of different signal spaces.

Having described a number of enhancements to the basic embodiments, it is clear that various novel combinations can be created to provide varied benefits. FIG. 18, for example, shows an arrangement where different signal spaces are employed at different times. The different signal spaces can be used at preselected times, or their use can be application dependent. The transmitter section of FIG. 18 includes a transmitter signal space selector switch 410, a data-only signal space coder 411, an analog-only signal space coder 412, an analog and data signal space coder 413, and a dual-use signal coder 414. Correspondingly, the receiver section includes a receiver signal space selector switch 420, a data-only signal space decoder 421, an analog-only signal space decoder 422, an analog & data signal space decoder 423, and a dual-use-signal space decoder 424.

The data-only coder 411 corresponds to the FIG. 6 coder with no input at line 51. The analog-only coder 412 corresponds to the FIG. 6 coder with no input at line 61. The analog & digital coder 413 corresponds to the FIG. 6 coder as described above, and the dual-use coder 414 is a coder where the symbols of line 61 in FIG. 6 are applied to only one of the orthogonal modulators, and the signals of line 51 in FIG. 6 are applied only to the other of the orthogonal modulators.

As indicated above, the signal space changes can be planned a priori such as at predetermined symbol times (e.g., with symbol counter 415 and selector 416). One might wish to send data only alternated with analog only, with the timing ratio being completely an option of the user. Alternatively, one may signal the beginning of a specific signal space mode, and signal again when that mode changes. The signal spaces need not be the same in the two communication directions. All such signaling is effected through "hand shaking" protocols between the communicating modems; which in the example shown in FIG. 16, is merely a synchronization between TX Symbol counter 416 and RX Symbol Counter 426.

The issue of sending side information has generally been discussed above, but it may be useful to also address a specific case of "side information": establishing and dismantling a connection.

Figure 30:
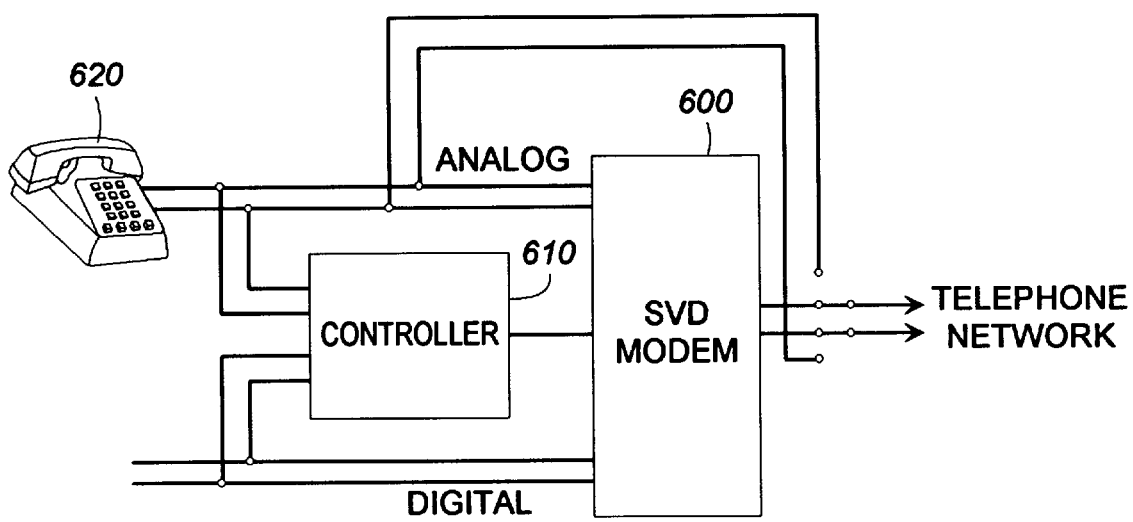
FIG. 30 presents a block diagram that includes the disclosed modem and means for bypassing the modem when it is inoperative.

In applications where a conventional telephone is connected to the analog port, the question is how will the connection be established and dismantled. FIG. 30 illustrates the arrangement for accomplishing these tasks, with a controller 610 that is connected to a modem 600.

As disclosed above, most current modems implement the necessary function in a processor that is under influence of stored program control. That is, the functions are implemented by programs that operate on numbers representing signals and ultimately develop the called-for signals. In such realizations, controller 610 is arranged to interrupt the normal program flow in modem 600 whenever the right conditions occur.

Thus, when telephone 620 goes "off hook", controller 610 senses the condition and forwards an interrupt to the microprocessor within modem 600. Modem 600 then goes into a "control mode" which reads the instructions provided to modem 600 by controller 610. When controller 610 specifies an "off hook" condition, modem 600 is reconfigured to pass through the signals arriving at the analog port directly to the telephone network. This can be accomplished in modem 600 by providing a separate signal path that is enabled, or by conditioning the various elements in the signal path to achieve the same end results. When telephone 620 is thus connected, dial tones can then flow to the telephone central office and establish a connection.

When a connection is established to a far end customer, modem 600 sends a tone, identifying itself as a) a modem and b) an svd modem. Once a connection to the far end equipment is established and the far end equipment identifies itself as an svd modem, then modem 600 assumes its svd modem architecture. If the far end equipment identifies itself as an non-svd modem, then modem 600 can establish itself as a conventional modem connecting its digital port to the far end equipment. Lastly, if the far end equipment identifies itself as a conventional telephone, modem 600 remains in its "short circuited" mode.

Dismantling a connection is at least as easy. An "on hook" condition is detected by controller 610 and, there is no "conversation" established on the data side, controller 610 signals modem 600 to turn itself off.

The "off hook" and "on hook" signaling described above is just illustrative. Other signaling can, of course, be used. For example, on the analog side, controller 610 can be responsive to touch tone sequence, including the "#" and the "*" tones. On the digital side, the DLE shielding signaling can be employed. In this manner, once a digital path is maintained, the digital signal source can effect a "disconnect".

FIG. 30 also depicts an enhancement for a modem failure mode. This enhancement would advantageously be incorporated in all uses of the disclosed modem where connection to a telephone function is desired even in the absence of local power. Specifically, FIG. 30 includes a pair of leads from the analog side of the modem to a pair of relay contacts 630. Relay contacts 630 are arranged to connect the telephone network leads to the telephone network port of modem 600 when modem 600 is operational, or to the analog port of modem 600, otherwise. The relay coil that operates contacts 630 (not shown) may simply be responsive to the leads that power modem 600, or to a "status OK" output lead of the modem.

In addition to the myriad combinations and permutations of capabilities that are achievable with modems employing the principles disclosed herein, there are also many novel applications that can now be realized. The following are just a number of examples.

Remote Software Support

Figure 19:
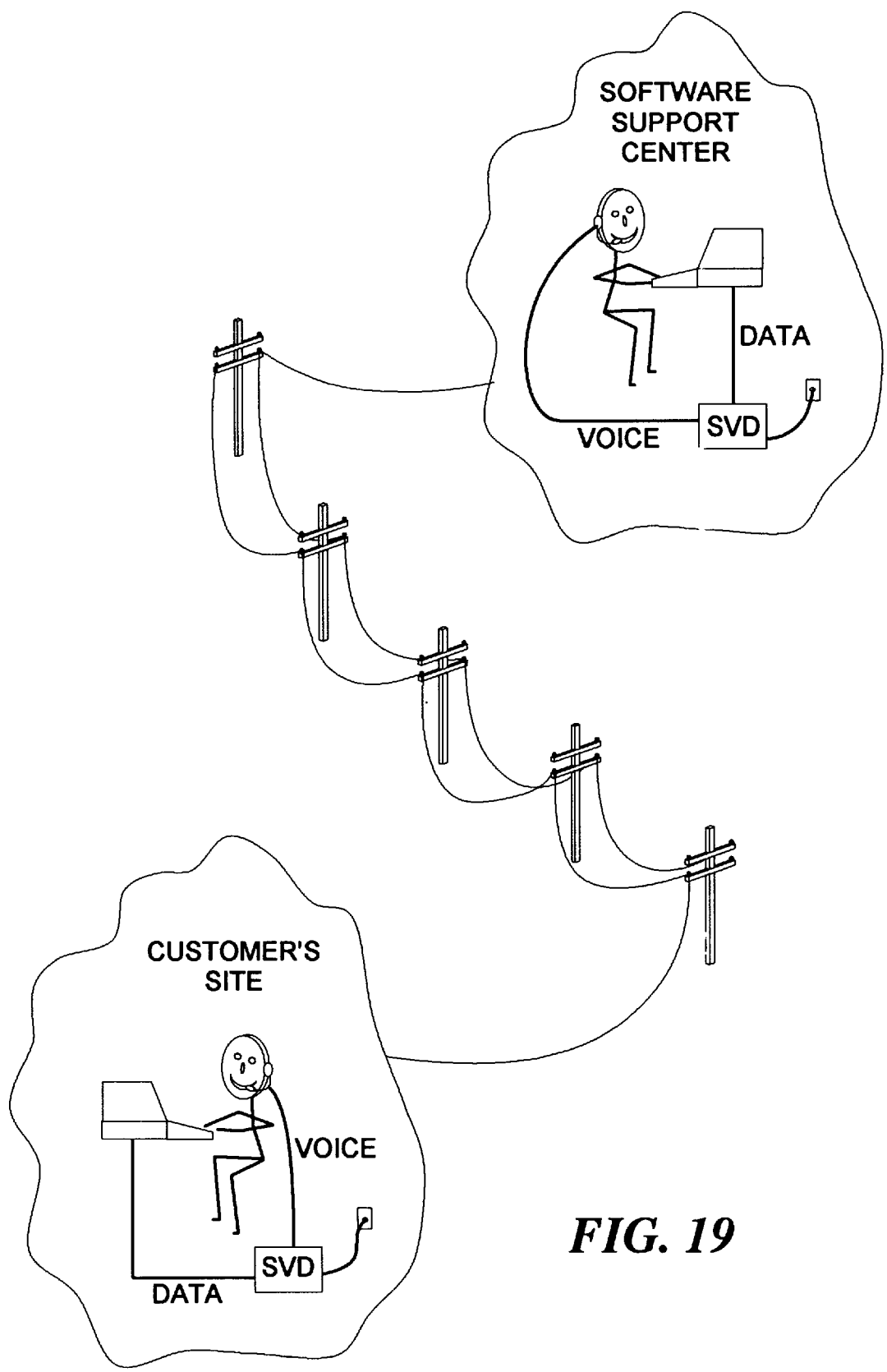
FIG. 19 depicts use of the disclosed modem in connection with software support.

It is not uncommon for a purchaser of a software package to require assistance from the software provider. Often it is beneficial for the software provider to see exactly what is occurring at the user's computer terminal but, currently, the best that a support person at the software provider's facility can do is attempt to duplicate the behavior of the user's computer. This is not always successful. With a modem employing the principles disclosed herein, it is possible for the software supplier to receive data from the customer's computer directly, in the same communications channel over which the customer and the software supplier's support person converse. This is depicted in FIG. 19.

Remnote System Support

Figure 20:
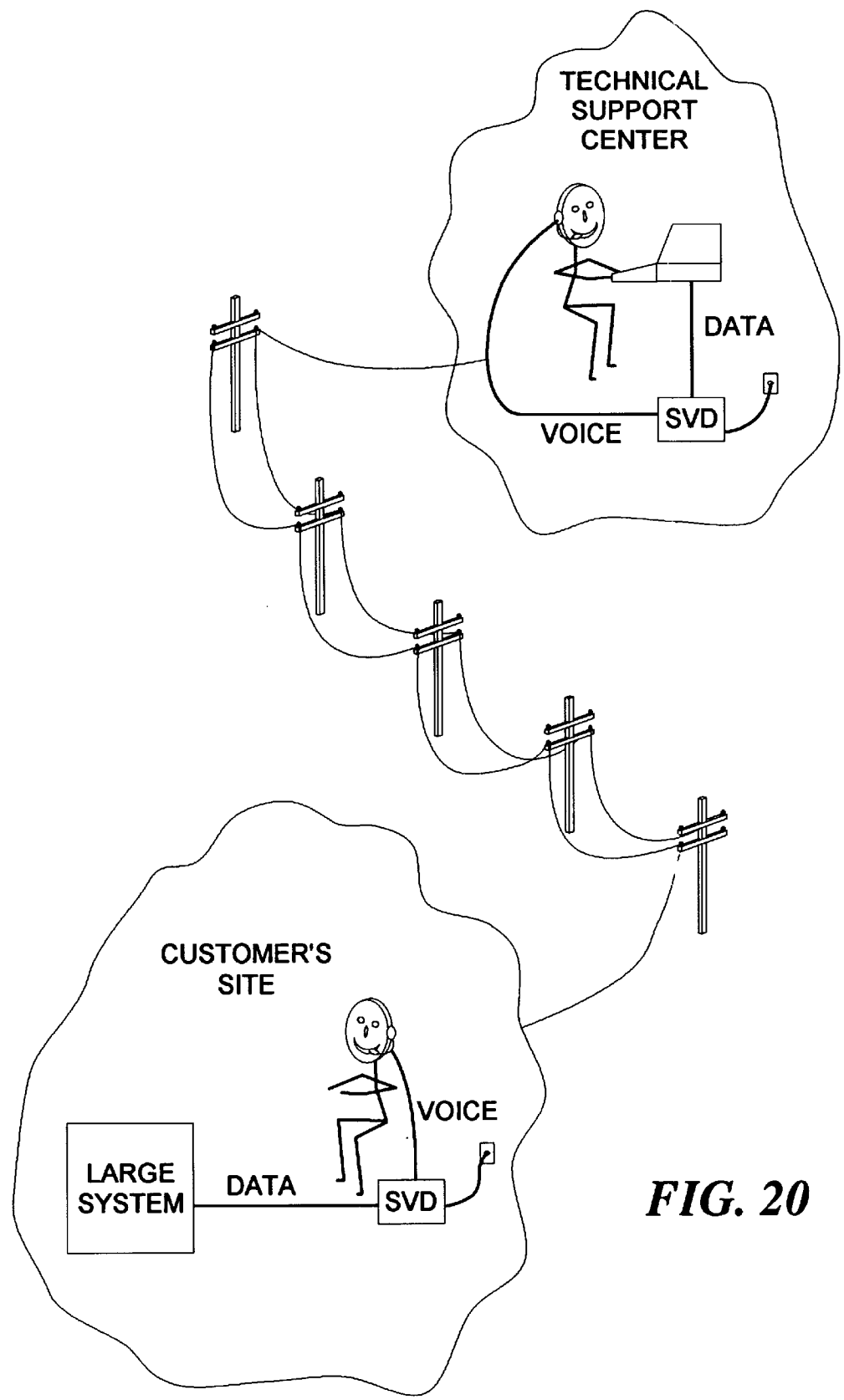
FIG. 20 depicts use of the disclosed modem in connection with apparatus diagnosis and maintenance.

In addition to the capabilities described above in connection with software support, one may desire to have support provided for the hardware. There are already many systems on the market where diagnostics can be applied through electronic ports. Examples of that are PBX's, computers, car, etc. Many more such systems will be developed in the near future. With a modem employing the principles of this invention, it is possible for a manufacturer to be connected to a malfunctioning apparatus at the customer's premises, and to test the apparatus remotely. In some cases, such as with computers and computer peripherals, remote repair can even be effected—e.g., by downloading new software. This is illustrated in FIG. 20.

Figure 21:
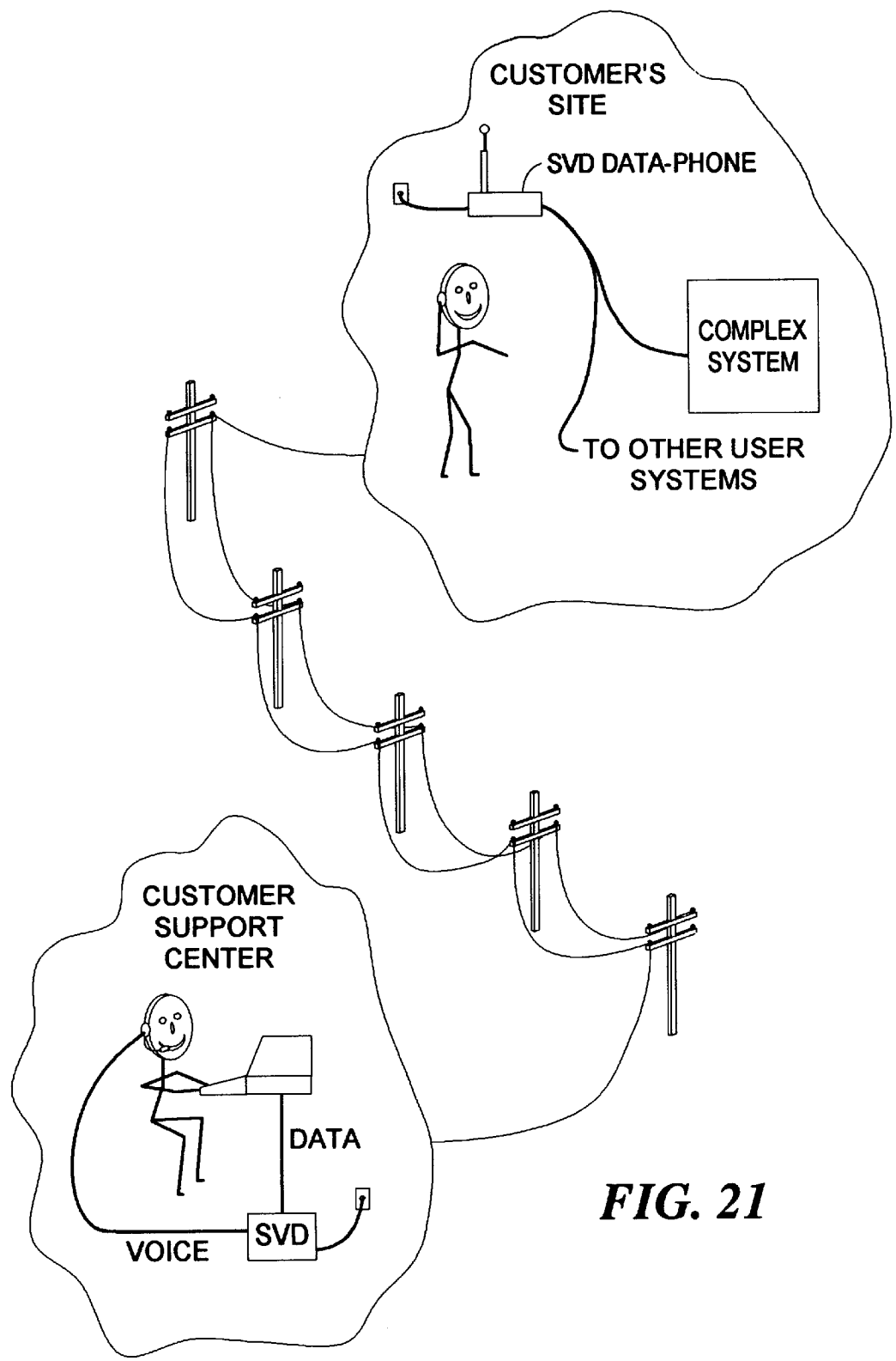
FIG. 21 depicts use of the disclosed modem in connection with apparatus diagnosis and maintenance with the modem coupled to a wireless base station.

In a home environment, it is likely that the equipment that may need to be remotely diagnosed may need to be also accessed by the user while the user is speaking with the manufacturer's support person. Since it is expected that such devices may not always be in close proximity to the telephone, customers will no doubt wish to employ their cordless telephones. To that end, it is beneficial to incorporate a modem employing the principles disclosed herein in the cordless telephone's base station. This is depicted in FIG. 21.

Home Agent

Figure 22:
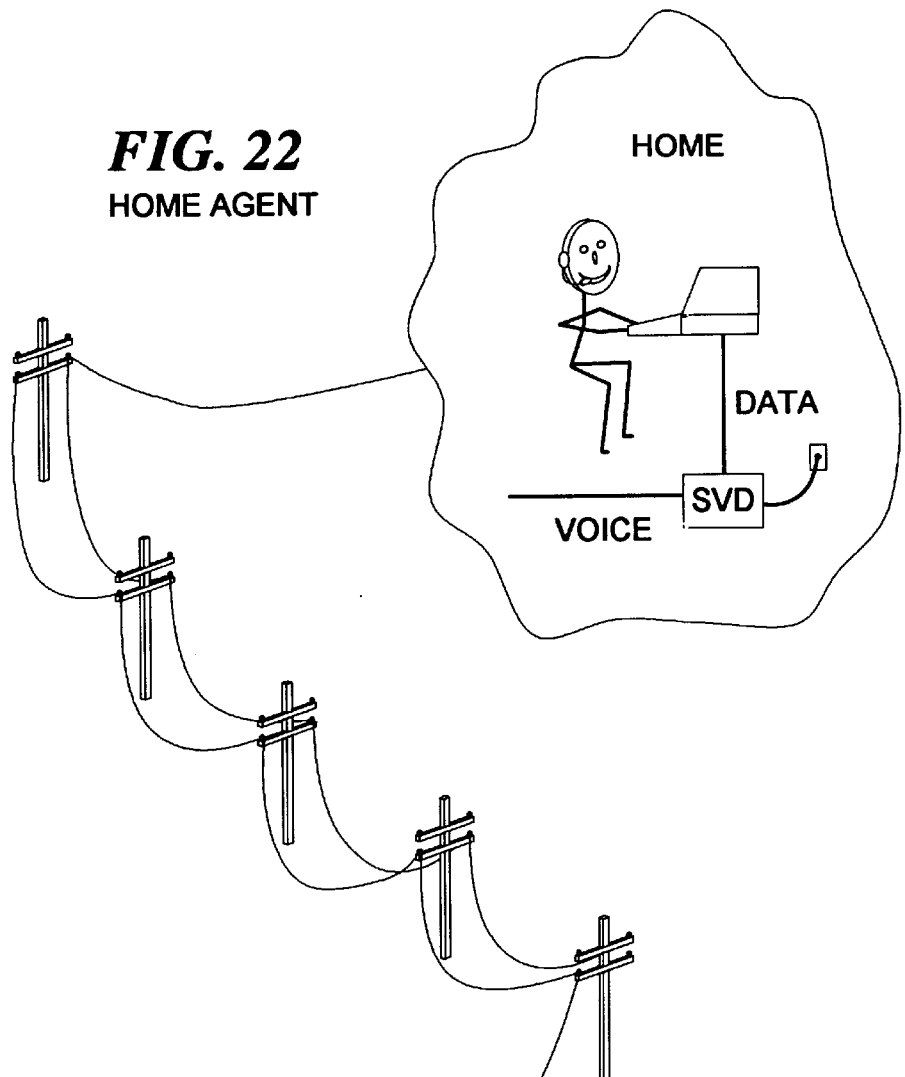
FIG. 22 shows use of the disclosed modem in connection with a call center.
Figure 22:
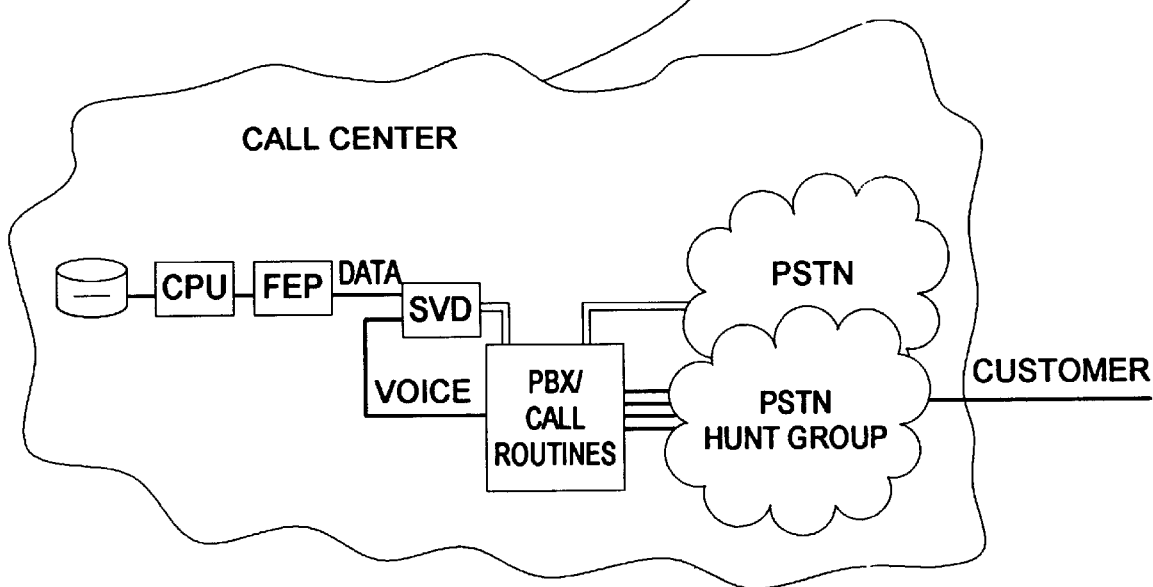

With increased sensitivity to environmental pollution that comes about from commuting to work, it is expected that many more people will be working at home. An agent that is typically interacting between customers who call in through an automatic call distributor (ACD) and a computer is an ideal candidate for a "work at home" situation. A typical example of such an agent is an airline Reservations Agent. FIG. 22 depicts such an arrangement employing a modem as disclosed above. A customer calls in to the Call Center and through the Call Center is connected to the home agent over the analog channel. Concurrently, the home agent is connected through the data channel to the computer in the Call Center. The home agent interacts simultaneously with both the customer and the Call Center's computer.

Of course, there is no requirement for the voice channel to be connected to a customer outside the Call Center. Connection of the home agent to its home base location (via the Call Center or any other place of business) for both voice and data is achievable with the modem disclosed herein.

Home Entertainment

Presently, youngsters who wish to play electronic games must sit together in one room and interact with the game device. With modems as disclosed above, that is no longer necessary. A connection can be made between two homes, with the data channel devoted to communicating between the two game devices, and the voice channel devoted to the conversation path between the two players. The bandwidth required for the data channel need not be very large because it need only communicate control information (such as start/stop and movement information) that originates with the player and is applied to the game device.

Figure 23:
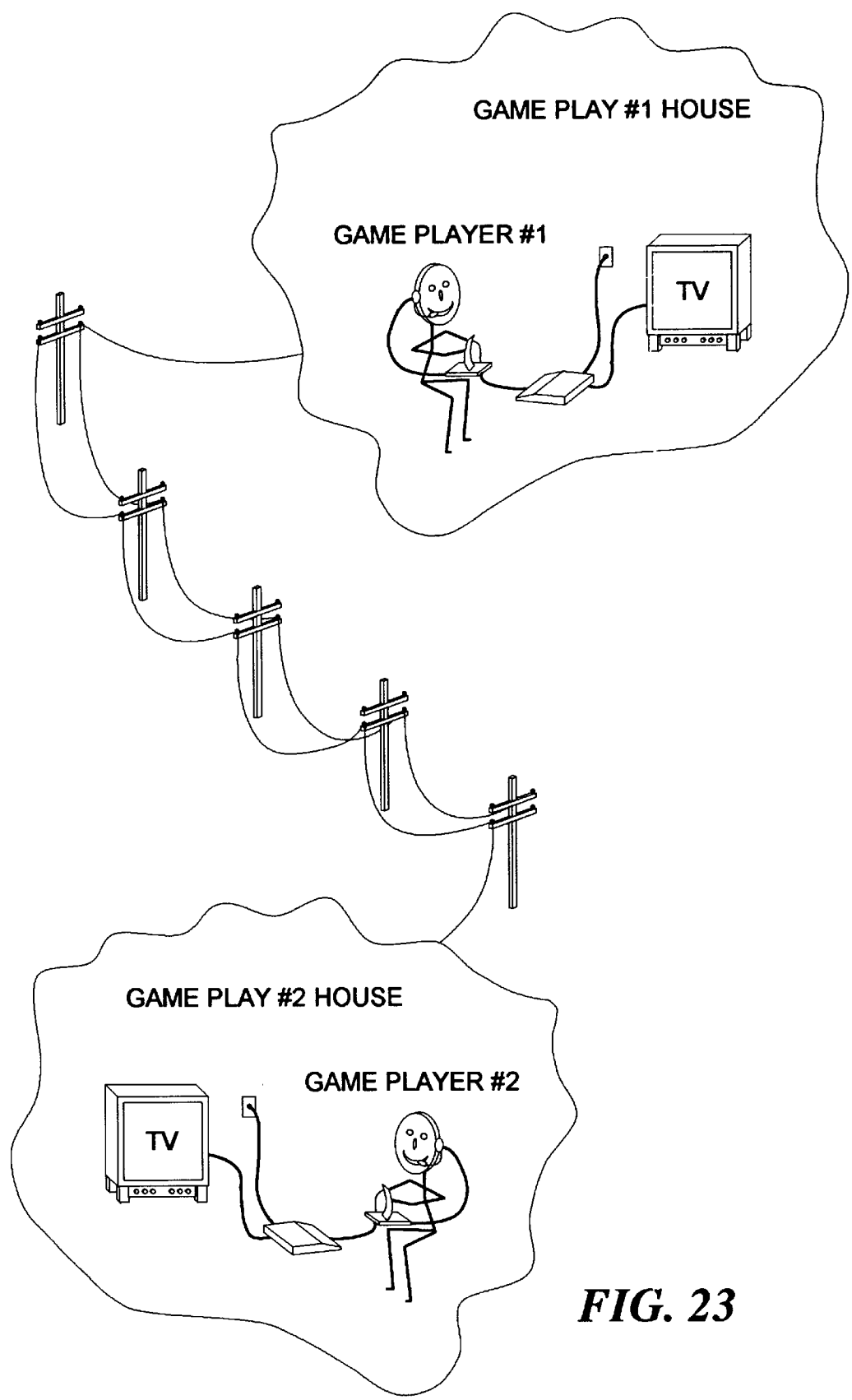
FIG. 23 shows use of the disclosed modem in an interactive game environment.

As in connection with the cordless telephone's base station, the modem disclosed herein is incorporated in the game device. This arrangement is depicted in FIG. 23.

TV Interface

Currently, television sets receive their input from an antenna, or from a coax cable. Much like the cable connection, televisions can receive input from a filter cable—providing a much increased bandwidth—, as well as from a conventional telephone tip-ring cord—providing a much reduced bandwidth. Whatever the nature of the connecting cable, televisions connected to cables are becoming interactive. That is, the cable service providers provide a two directional channel path, through which customers can actively interact with the cable service providers.

Figure 24:
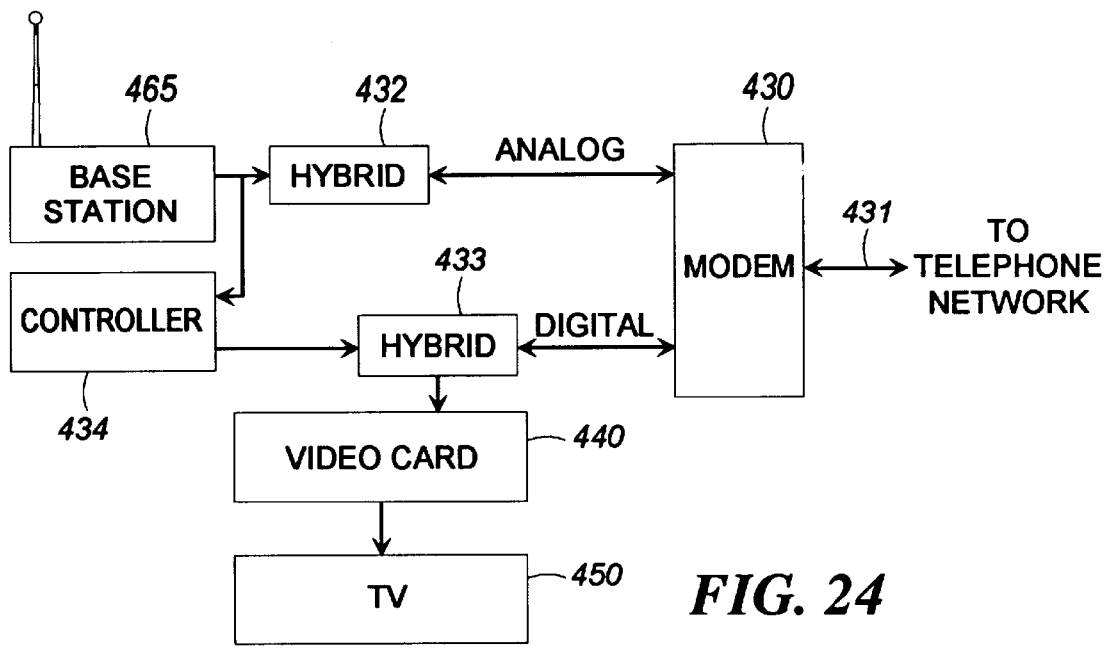
FIG. 24 presents a block diagram depicting use of the disclosed modem in an interactive mode with a television display.

FIG. 24 depicts an embodiment which integrates telephony, data communication and video control for a conventional telephone cord connection to a television. Of course, because of the very low bandwidth of the telephone cord, only sequences of still pictures can be transmitted to the television. In FIG. 24, element 430 is the modem disclosed herein. It is connected to the telephone network via line 431. The analog port of modem 430 and the digital port of modem 430 are connected to video card 440 via hybrids 432 and 433. Modem 430 receives image and voice signals from line 431, card 440 combines the received signals, forms a composite signal and applies the composite signal to television 450.

Cordless telephone 460 communicates with line 431 through the cordless base station electronics 465. The arrangement of FIG. 24 contemplates that the voice signals would be applied to the telephone line through hybrid 432 and modem 430. The touch tone signals, which are the control signals sent to the cable service provider are converted to digital form in block 434 and applied to the telephone line throughout hybrid 433 and modem 430. Hybrids 432 and 433 merely ensure that the data sent to the telephone line does not interfere with the information sent to the television. Of course, if the control signals can be embedded in the voice signal and deciphered by the cable service provider at the distant end, then the connection between block 465 and the digital port of modem 430 can be severed and elements 433 and 434 can be deleted.

The above-described arrangement that contemplates use of a telephone cable can be easily extended to wide bandwidth cables 431. All that is needed is a frequency division splitter interposed between the cable and modem 430. The high bandwidth signals that are destined to the TV can be sent directly to the TV, while the low bandwidth communication channel is sent to modem 430.

The above-described arrangement can also be extended as described in more detail hereinafter to recognize and react to control signals arriving from base station 465. Such signals, e.g., "on-hook" and "off-hook" signals, can be recognized by controller 434 which is arranged to apply control signals to modem 430, causing modem 430 to react to the control signals in the appropriate manner. In a modem 430 implementation that includes a stored program controlled microprocessor, controller 434 can merely send an appropriate interrupt signal to the controller.

Cellular

Cellular telephony is extending to data. A number of companies are now offering arrangements where computers are connected to distant nodes via cellular networks. Some of these new computers are even so small that they are termed "notepad" computers. Data is sent by computers through modems, and modems now exist that are fully contained within a PCMCIA standard card.

Figure 25:
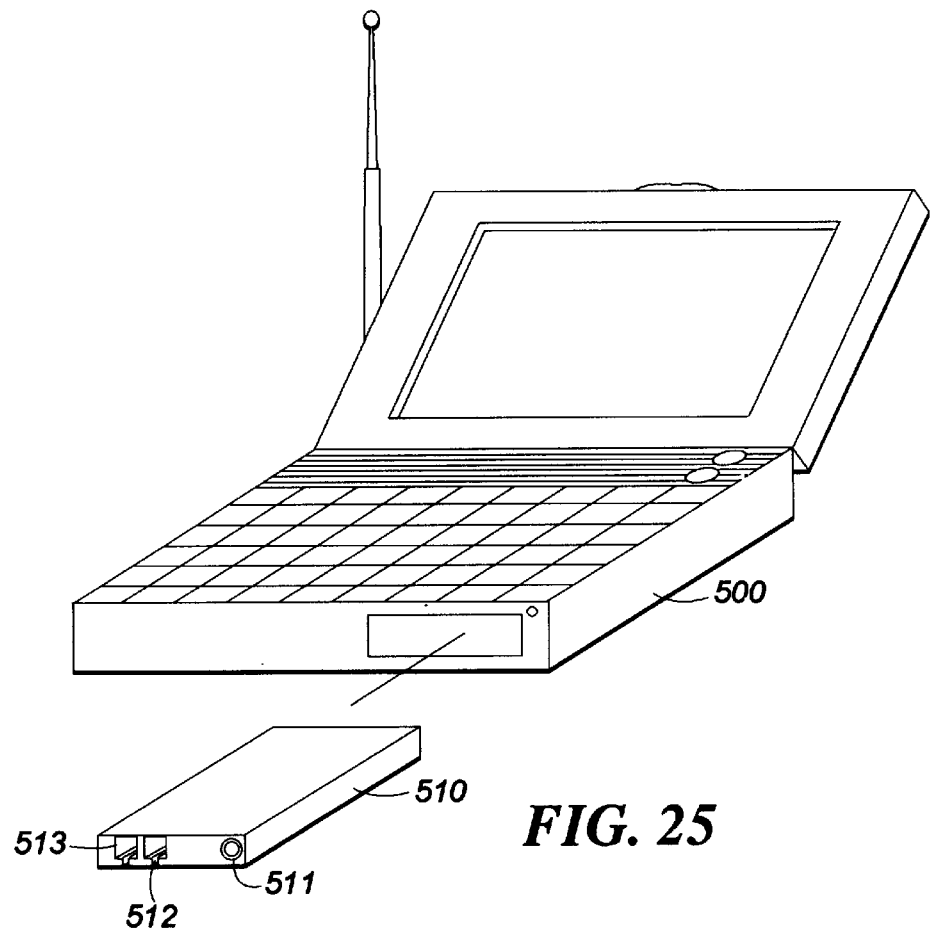
FIG. 25 presents the disclosed modem in a PCMCIA configuration, adapted for inclusion with wireless apparatus, such as a wireless computer.

As depicted in FIG. 25, notepad computer 500 is adapted to receive a PCMCIA modem 510 that is constructed in accordance with the disclosure herein, and this modem includes a voice port 511. With the system of FIG. 25, users of the computer can achieve the same connectivities that users of the previously described systems can achieve. Optionally, the PCMCIA modem also includes a conventional RJ-11 socket (512, 513) for plugging in a conventional telephone.

Of course, device 500 need not be a computer. It can merely comprise the wireless transmission and receiving circuitry that interacts with modem 510, offering a digital port for whatever use may be desired. For example, a "wireless svd modem" can be placed on a dashboard of a car that is being maintained, the digital port would be connected to the analysis port of the car's electronic system, the analog port would be connected to a telephone instrument and the car mechanic would then be able to converse with a service center in the manner described in connection with FIGS. 19–21.

Enhanced Hardware

Figure 26:
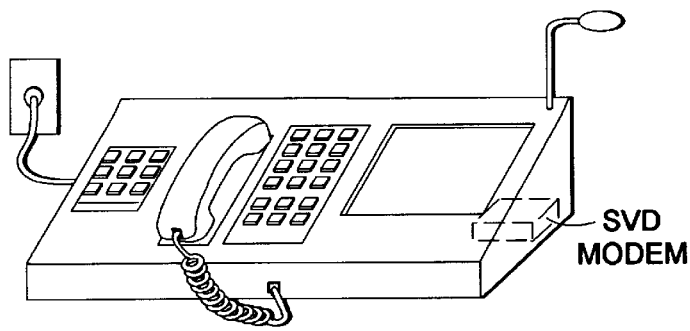
FIG. 26 shows use of the disclosed modem in a telephone instrument that includes video capabilities.
Figure 27:
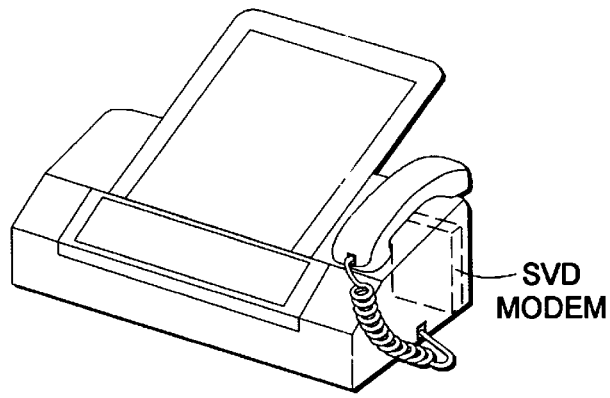
FIG. 27 shows use of the disclosed modem in a fax machine.
Figure 28:
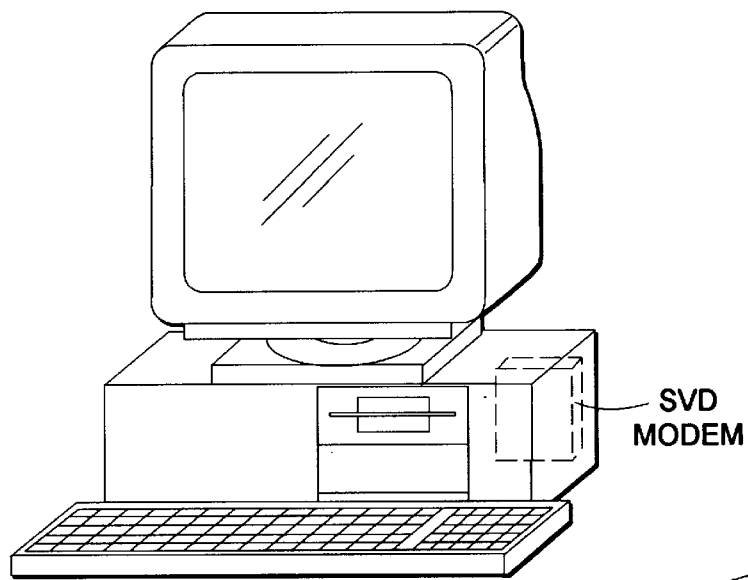
FIG. 28 shows use of the disclosed modem in a personal computer.
Figure 29:
FIG. 29 shows use of the disclosed modem in a "plain old" telephone.

All kinds of hardware that are currently connected to the network can incorporate the modem disclosed herein. This includes fax machines, computers, simple telephones and enhanced telephones. FIGS. 26–28, for example, depict a telephone with video capability that includes such a modem, a simple telephone that includes such a modem, and a socket for data interface, a fax machine that includes such a modem and a computer that includes such a modem. Like some of the currently available fax machines, the computer may include all circuitry that is needed for the telephone function, leaving only the hand set to be connected to the RJ-11 plug. Like the AT&T 7300 PC, hands free Speakerphone capability can be incorporated. It may be noted that the modem shown in FIG. 28 is depicted as a box but, more likely, it will be constructed on a printed circuit board and plugged into one of the standard open slots that are in the computer. The RJ-11 connector that is depicted in the drawing and into which a telephone on the telephone hand-set would be plugged in (depending on the design, as discussed above) might be on the modem's printed circuit board, or it might be positioned in the PC's housing for easier access by the user.

Sketching Unit for Transmission of Notes Over Telephone

Figure 31:
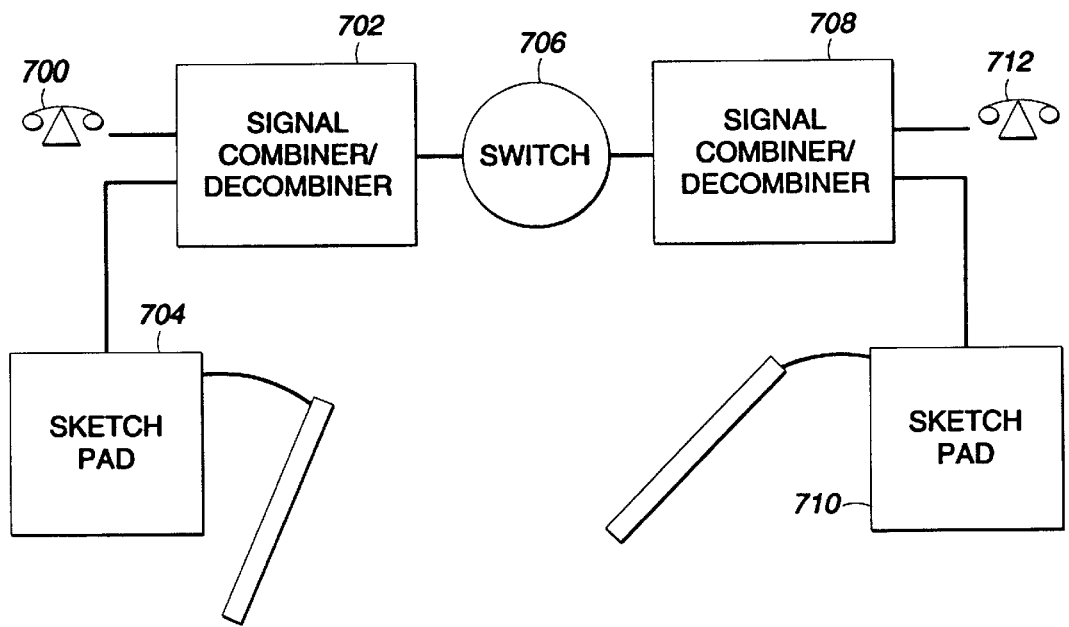
FIG. 31 is block diagram of the conceptual structure of the sketching unit of the present invention.

FIG. 31 is block diagram of the sketching unit of the present invention. In FIG. 31, telephone 700 transmits analog voice signals to signal combiner/de-combiner 702 for combining the voice signal with digital signals output from sketch pad 704. The combined signal is then transmitted over a standard telephone line via conventional telephone switch 706 to signal combiner/de-combiner 708 for separating the combined signal into the voice analog signal and the sketch pad digital signals. Once the combined signal has been separated, the analog voice signal is transmitted to telephone 712 to establish voice communication between telephones 700 and 712. In addition, the digital signal is transmitted to sketch pad 710 to establish graphical communication between sketch pads 704 and 710.

The above description for FIG. 31 was provided for voice and sketch communication generated by telephone 700 and sketch pad 704 However, this description is equally applicable when telephone 712 and sketch pad 710 generate the voice and digital signals for transmission to telephone 700 and sketch pad 704.

Figure 32:
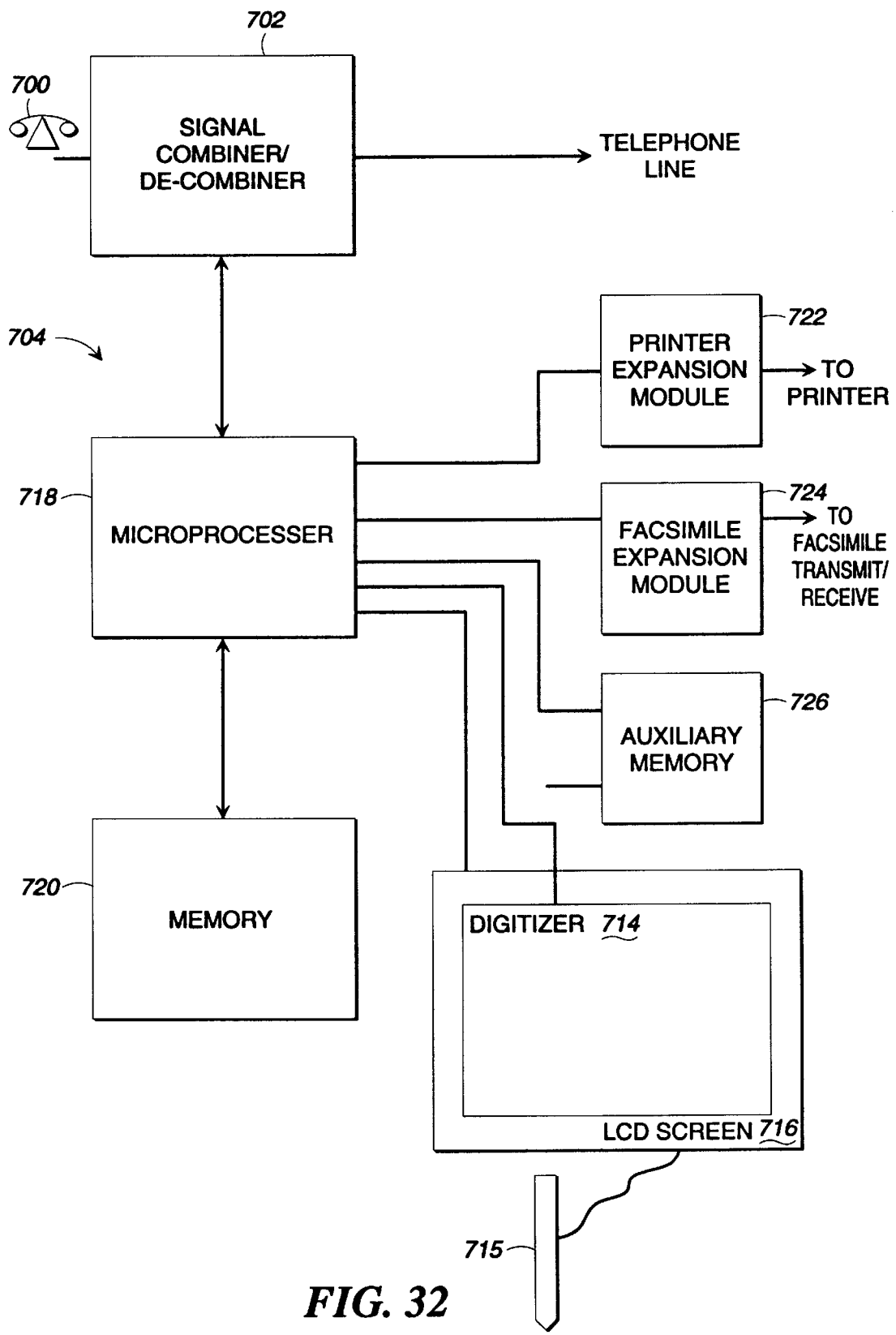
FIG. 32 is a block diagram of the construction of the sketching unit of the present invention.

FIG. 32 is a more detailed block diagram of the sketching unit of the present invention. In FIG. 32, telephone 700 transmits analog voice signals to signal combiner/de-combiner 702. In addition, digitizer 714 transmits digital signals identifying x-y coordinate positions of pen 15 to microprocessor 718. Microprocessor 718 transmits the digital signals to signal combiner/de-combiner 702 which combines the analog voice signal with the digital signal for transmission over a conventional telephone line.

Signal combiner/de-combiner 702 preferably comprises the signal combiner/decombiner of the present invention as illustrated in FIGS. 6 and 10 which is able to provide simultaneous use of sketch pad 704 and telephone 700 over a single telephone line. However, signal combiner/de-combiner 702 may also be any suitable device which is able to combine digital and analog signals and separate a combined signal into its digital and analog components. In addition, digitizer 714 is preferably a clear digitizing pad which is placed on top of LCD screen 716. Digitizer 714 and LCD screen 716 are conventional and may be, for example, the combined clear digitizing pads and LCD screens manufactured by Apple Computer Company for the NEWTON Computer, or the EXPERT PAD manufactured by Sharp Company. Further, digitizer 714 and LCD screen 716 may be separate devices. For example, digitizer 714 may be the clear digitizer manufactured bu Touch Technology, and LCD screen 716 may be, for example, one of the family of LCD screens manufactured by Epson or Sharp Company.

Microprocessor 718 processes the received signals from digitizer 714 and illuminates the appropriate pixels in LCD screen 716 so that the user of pen 715 on digitizer 714 is able to view the image being created on LCD screen 716. In addition, microprocessor 718 receives digital signals generated by another sketch pad, e.g., sketch pad 710 in FIG. 31, for display on LCD screen 716 as well. Thus, LCD screen 716 is illuminated in response to a user of its own sketch pad 704 as well as inputs from other sketch pads. Microprocessor 718, however, transmits the digital signal from sketch pad 704 and other sketch pads according to a pre-defined user selective format as will be discussed in greater detail below. Microprocessor 718 is conventional and may be, for example, a standard 16 bit input/output micro processor available via Intel, etc. Alternatively, microprocessor 718 may also be a standard digital signal processor having a 16 bit input/output capability such as the AT&T DSP 16A.

Microprocessor 718 is connected to standard memory 720 which may include, for example, a random access memory (RAM) or a read only memory (ROM) for storing instructions for processing the digital data received from signal combiner/de-combiner 702 and digitizer 714 (the specific format for transmitting the digital data will be discussed in greater detail below). However, the various instructions which microprocessor 718 uses for transmitting the digital data may be, for example, written in microcode, and based upon the transmission format discussed below may be provided to microprocessor 718 by any standard software/processor programmer or developer.

Microprocessor 718 may also transmit the digital data according to the user selective format to printer expansion module 722 which formats the digital data in a compatible format for an attached printer. Alternatively, printer expansion module 722 and the printer may be combined in an integrated device. In addition, a conventional auxiliary memory 726 is provided for storing images that the user wishes to retain for later use. Microprocessor 718 transmits the images to memory 726 upon selection of the feature by the sketch pad user which is described in greater detail below.

Finally, microprocessor 718, upon selection by a user, transmits the digital data to facsimile expansion module 724 to format the digital data according to standard facsimile communication requirements for transmission by a facsimile machine connected thereto. Alternatively, facsimile expansion module 724 and the facsimile machine may be combined in an integrated device.

Figure 33:
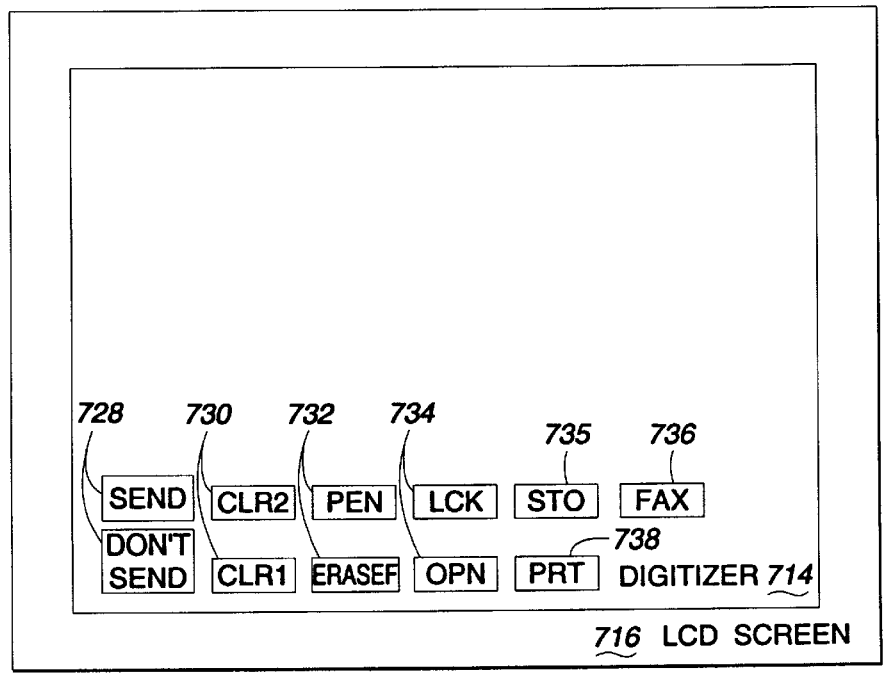
FIG. 33 is a diagram of the user interface of the sketching unit of the present invention.

FIG. 33 is a diagram of the user interface of the sketching unit of the present invention which defines the user selective format and funtions for microprocessor 718 to transmit digital data to signal combiner/de-combiner 702 and to transmit digital data to the LCD screen 716. As shown in FIG. 33, the user selective format preferably is determined from predesignated coordinates on digitizer 716 which microprocessor 718 is pre-programmed to identify. Accordingly, when microprocessor 718 received coordinates from, for example, the send/don't send function 728 locations on digitizer 714, microprocessor detects the pre-designated coordinates according to conventional techniques and performs the appropriate function as is hereinafter described.

The send/don't send function 728 is used to permit sketch pad 704 user to transmit the digital data while the image is being created on digitizer 714 when the send/don't send function 728 is in the send mode, i.e., the pen user has touch portion 728 of digitizer 714 which reads "send". When the send/don't send function 728 is in the don't send mode, microprocessor 718 will collect the various coordinate data from digitizer 714 in memory 720 and hold transmission of all the digital data until the send/don't send function is placed in the send mode. Once the send/don't send function is placed in the send mode, microprocessor 718 will transmit all the collected data to the destination sketch pad for graphical communication.

Next, digitizer 714 includes clear function 730 which clears the entire LCD screen 716 when clear function 730 is in the clr 1 mode, and also attempts to clear the LCD screen of another sketch unit when clear function 730 is in the clr 2 mode. As will be described, the LCD screen of the another sketch unit will be cleared when the user of the other sketch unit has placed the LCD screen in an unlock mode.

Digitizer 714 also includes write function 732 which indicates to microprocessor 718 to write data, i.e. illuminate, LCD screen 716 when the write function 732 is in the pen mode. When write function 732 is in the erase mode, microprocessor 718 erases all coordinate data created by pen 715, and selectively does not illuminate LCD screen 716. Accordingly, the user is able to selectively erase portions of images created by sketch unit 704 or even other sketch units.

Digitizer 714 further includes lock function 734 which indicates to microprocessor 718 to prevent digital data transmitted from other sketching pads from being transmitted to LCD screen 716 when lock function 734 is in the Ick mode. Thus, the lock mode permits the user of sketch pad 704 from being interrupted by continuous transmission from another sketch pad such as by a non-stop image "talker". Lock function 734 also includes the opn mode which opens LCD screen 716 to other sketch pad users and permits LCD screen 716 to be altered responsive to other sketch pads.

Finally, digitizer 714 includes a store function, sto 735, for storing image data in auxiliary memory 726, a print function, prt 738, for printing the image data on a printer via printer expansion module 722, and a facsimile function, fax 736, for transmitting the image data using a facsimile machine via facsimile expansion module 724.

While the above functions have been described using digitizer 714 to notify microprocessor 718 of the various selected functions, other conventional means may be used such as simple toggle switches placed on the sketching unit or on the auxiliary devices to indicate to microprocessor 718 of the selected function.

In addition, while the previous discussion assumed all portions of LCD screen 716 were used by both sketch pad 704 and other sketch pads, LCD screen may alternatively be divided into first and second sections. The first section is preferably used for the pen user of sketch pad 704 to create images which are transmitted to another sketch pad, but is preferably not used for receiving images from other sketch pads. The second section is preferably used for receiving images from other sketch pads, but is typically not used for generating images to be transmitted to the other sketch pads. In this manner, sketch pad 704 is able to separate out various images and permits concurrent image communication of separate images. In order to accomplish this feature, microprocessor 718 is pre-programmed according to conventional techniques to recognize that certain coordinates of LCD screen 716 are illuminated responsive to other sketch pad digital data and other coordinates are illuminated responsive to digital signals generated pen 715 creating an image on digitizer 714. This feature may also be user selectable in a similar manner as the functions described with reference to FIG. 33.

For the divided screen feature, sketch pad 704 preferably includes a copy function which permits the sketch pad receiving the image on a first part of LCD screen 716 and copied to a second part of LCD screen 716 where the sketch pad user may alter the received image and re-transmit the altered image back to the sketch pad which created the initial image. This feature may be implemented in a similar manner as the previous features where a particular coordinate pair is designated to indicate to microprocessor 718 to copy the same image which is displayed on one part of LCD screen 716 onto a second part of LCD screen 716 using memory 720 which would store current images displayed on LCD screen 716.

Further, sketching pad 704 may also be provided with the function of automatically establishing connection with an incoming telephone call when the telephone call is not answered and the person is not available to answer the voice or graphical call. In this scenario, sketching pad 704 is provided with a conventional call detection device which determines that an incoming call is being received by the sketching pad and a timer for determining when the incoming call has reached a predesignated time out period which indicates that no person is available to receive the telephone voice/graphic call. Accordingly, sketch pad 704 may then be actuated to receive the graphical data even though no person receives the telephone call. This provides the added benefit of, for example, being able to graphically communicate with another party when the other party is not home. For example, travel directions or written messages may be left on the other sketch pad and may be used concurrently with the voice answering machine.

The many features and advantages of the invention are apparent from the detiled specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A sketching system for sketching first notes to be transmitted over a telephone line during a telephone call using the telephone line, the sketching system receiving second notes from another sketching system, the sketching system comprising:
    a signal de-combiner device, receiving the second notes from the another sketching system and voice data as a combined signal via the telephone line and de-combining the combined signal into the second notes and the voice data;
    a sketching unit connected to said signal de-combiner and including
        a note displaying device displaying the first and second notes;
        a note generating device generating the first notes;
        a processor connected to said note displaying and generating devices and to said signal de-combiner, receiving the first notes from said note generating device, receiving the second notes from said de-combiner device, and transmitting the first and second notes to said note displaying device,
        clearing means for selectively clearing one of said note displaying device and another note displaying device of said another sketching system, the clearing means being selectively operable to: (1) clear said note displaying device and not clear said other note displaying device, (2) clear said other note displaying device and not clear said note displaying device, and (3) clear both said note displaying device and said other note displaying device;
        erase means for selectively erasing the first and second notes displayed on one of said note displaying device and said another note displaying device the erase means being selectively operable to: (1) erase the first and second notes displayed on said note displaying device but not on the noted displaying device of said other sketching system, (2) erase the first and second notes displayed on the note displaying device of said other sketching system but not on said note displaying device; and (3) erase the first and second notes displayed on both the note displaying device and on the note displaying device of said other sketching system;
        first lock means for selectively preventing said processor from transmitting the first notes of the note generating device and, preventing the first notes from being displayed on said another sketching system; and
        second lock means for selectively preventing said processor from transmitting the second notes to said note displaying devices;
        wherein the sketching system operates in a full duplex mode such that said first notes and said second notes can be simultaneously created and edited on said display.

2. A sketching system according to claim 1, further comprising an auxiliary memory connected to said processor and storing one of the first and second notes.

3. A sketching system according to claim 1, further comprising:

printer interface means receiving one of the first and second notes from said processor and formatting said one of said first and second notes into formatted notes; and a printer connected to said printer interface means and printing the formatted notes.

4. A sketching system according to claim 1, further comprising:

facsimile interface means receiving one of the first and second notes from said processor and formatting said one of said first and second notes into formatted notes; and a facsimile connected to said facsimile interface means and transmitting the formatted notes.

5. A sketching system according to claim 1, wherein said note generating device comprises a clear digitizing pad disposed on said note displaying device.

6. A sketching system according to claim 1, wherein said erase means of the sketching system selectively erases the second notes displayed on the another sketching system.

7. A sketching system according to claim 1, wherein said note displaying device comprises first and second note display sections, wherein said first note display section only displays the first notes alterable only via said sketching system, and wherein said second note display section only displays the second notes alterable only via said another sketching system.

8. A sketching system according to claim 1, further comprising a telephone generating local voice data; and a signal combiner device connected to said telephone and to said sketching unit, said signal combiner device receiving the first notes from said processor generated by said note generating device and the local voice data from said telephone, the combiner including means for combining the first notes and the local voice data into a second combined signal and transmitting the second combined signal over the telephone line to another telephone and the another sketching system.

9. A sketching system for sketching first notes to be transmitted over a telephone line during a telephone call using the telephone line, the sketching system receiving second notes from another sketching system, the sketching system comprising:

a sketching unit including a note displaying device displaying the first and second notes;

a note generating device generating the first notes;

a processor connected to said note displaying and generating devices, receiving the first notes from said note generating device, receiving the second notes from the another sketching system, and transmitting the first and second notes to said note displaying device, clearing means for clearing one of said note displaying device and another note displaying device of the another sketching system, the clearing means being selectively operable to: (1) clear said note displaying device and not clear said other note displaying device, (2) clear said other note displaying device and not clear said note displaying device, and (3) clear both said note displaying device and said other note displaying device;

erase means for selectively erasing the first and second notes displayed on one of said note displaying device and said another note displaying device;

first lock means for preventing said processor from transmitting the first notes to the another sketching system and preventing the first notes from being displayed on the another sketching system; and second lock means for preventing said processor from transmitting the second notes to said other displaying device; and a signal combiner device connected to said processor, receiving the first notes from said processor and voice data, combining the first notes and the voice data into a combined signal, and transmitting the combined signal to the another sketching system;

wherein said sketching system operates in a full duplex mode such that said first notes and said second notes can be simultaneously created and edited on said display.

10. A sketching system according to claim 9, further comprising:

an auxiliary memory connected to said processor and storing one of the first and second notes;

printer interface means receiving one of the first and second notes from said processor and formatting said one of said first and second notes into formatted notes;

a printer connected to said printer interface means and printing the formatted notes;

facsimile interface means receiving one of the first and second notes from said processor and formatting said one of said first and second notes into formatted notes; and a facsimile connected to said facsimile interface means and transmitting the formatted notes formatted by said facsimile interface means.

11. A sketching system according to claim 9, wherein said erase means of the sketching system selectively erases the second notes displayed on the another sketching system.

12. A sketching system according to claim 9, wherein said note displaying device comprises first and second note display sections, wherein said first note display section only displays the first notes alterable only via said sketching system, and wherein said second note display section only displays the second notes alterable only via the another sketching system.

13. A sketching system according to claim 12, wherein the another sketching system comprises the another note displaying device including third and fourth note display sections, wherein the first note display section is used for generating the first notes transmitted to the third note display section of the another sketching system, and wherein the second note display section is used for receiving the second notes transmitted from and generated by the fourth note display section of the another sketching system.

14. A sketching system according to claim 13 wherein said fourth note display section only displays the second notes alterable only via said another sketching system, and wherein said third note display section only displays the first notes alterable only via said sketching system.

15. A sketching system according to claim 12,
further including means having a call detection device for automatically establishing a connection with the telephone line when the telephone call is not answered, and wherein said sketching unit receives the second notes on the second note display section as messages when said sketching unit automatically establishes connection with the telephone call.

16. A sketching system according to claim 12, further comprising copy means for indicating to said processor to copy the second notes representing a first image onto said first note displaying section as a second image.

17. A sketching system for sketching first notes to be transmitted over a telephone line during a telephone call using the telephone line, the sketching system receiving second notes from another sketching system, the sketching system comprising:

a sketching unit including
   a note displaying device displaying the first and second notes;
   a note generating device generating the first notes;
   a processor connected said note displaying and generating devices, receiving the first notes from said note generating device, and transmitting the first notes to the another sketching unit; and
a signal combiner device connected to said processor, receiving the first notes from said processor and voice data and combining the first notes and the voice data into a combined signal, said signal combiner device including
   a first mapper receiving the first notes and generating a first map signal;
   a second mapper receiving the voice data and generating a second map signal;
   an orthogonal modulator connected to said first and second masers and generating a combined signal responsive to first and second map signals received from said first and second mappers;
   wherein said sketching system operates in a full duplex mode such that said first notes and said second notes can be simultaneously created and edited on said display; and
means for partitioning the note displaying device into distinct and non-overlapping first and second portions, wherein the first notes are displayed in the first portion and the second notes are displayed in the second portion.

18. A sketching system according to claim 17, wherein said sketching unit further comprises clearing means for clearing one of said note displaying device and another note displaying device of said another sketching system.

19. A sketching sytem according to claim 18, wherein said sketching unit further comprises erase means for selectively erasing the first and second notes displayed on one of said note displaying device and said another note displaying device.

20. A sketching system according to claim 17, wherein said sketching unit further comprises first lock means for preventing said processor from transmitting the first notes to the another sketching system; and second lock means for preventing said processor from transmitting the second notes to said note displaying device.

21. A method of sketching first notes using a sketching system to be transmitted over a telephone line during a telephone call using the telephone line, and receiving second notes from another sketching system, the method comprising the steps of:

(a) receiving the second notes from the another sketching system and voice data as a combined signal via the telephone line and de-combining the combined signal into the second notes and the voice data;

(b) generating the first notes;

(c) displaying the first notes generated in said generated steb (b) and displaying the second notes received in said receiving step (a) such that said first notes and said second notes can be simultaneously edited, (d) selectively erasing the first and second notes displayed on the one of the note displaying device of the sketching system and the another note displaying device of the another sketching system;

(f) selectively preventing transmission of the first notes to the another sketching system; and (g) selectively preventing transmission of the second notes to the note displaying device of the sketching system.

* * * * *